US010742479B2

(12) United States Patent
Gotoh et al.

(10) Patent No.: US 10,742,479 B2
(45) Date of Patent: *Aug. 11, 2020

(54) MANAGEMENT OF EVENTS AND MOVING OBJECTS

(71) Applicant: International Business Machines Corporation, Armonk, NY (US)

(72) Inventors: Yasuhisa Gotoh, Yokohama (JP); Eisuke Kanzaki, Fujisawa (JP); Tomohiro Miyahira, Tokyo (JP); Hiroya Ogihara, Kawasaki (JP); Gaku Yamamoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/801,054

(22) Filed: Jul. 16, 2015

(65) Prior Publication Data

US 2017/0010112 A1 Jan. 12, 2017

Related U.S. Application Data

(63) Continuation of application No. 14/792,805, filed on Jul. 7, 2015.

(51) Int. Cl.
*H04W 64/00* (2009.01)
*G08G 1/123* (2006.01)
(Continued)

(52) U.S. Cl.
CPC ............ *H04L 41/046* (2013.01); *G01C 21/28* (2013.01); *G01C 21/3415* (2013.01);
(Continued)

(58) Field of Classification Search
CPC ... H04L 41/046; H04L 67/1002; H04L 67/12; G01C 21/28; G01C 21/3453;
(Continued)

(56) References Cited

U.S. PATENT DOCUMENTS 4,350,970 A 9/1982 Von Tomkewitsch
4,907,159 A 3/1990 Mauge
(Continued)

FOREIGN PATENT DOCUMENTS

CN 102147260 A 8/2011
CN 102231231 A 11/2011
(Continued)

OTHER PUBLICATIONS

IBM, "List of IBM Patents or Patent Applications Treated as Related (Appendix P)," Mar. 28, 2016, p. 1-3.
(Continued)

*Primary Examiner* — Kevin T Bates
*Assistant Examiner* — Golam Mahmud
(74) *Attorney, Agent, or Firm* — Erik K. Johnson

(57) ABSTRACT

A system comprising: an event server including a plurality of event agents for handling events occurring in a geographic space; a selector operable to select an event agent among the plurality of event agents for handling an event candidate based on a type of a source information; and a mobile object server including a mobile object agent assigned to a moving object in the geographic space, wherein the mobile object server is operable to execute the mobile object agent to collect information of an event from the selected event agent and provide the moving object with information that assists the moving object with traveling in the geographic space.

17 Claims, 19 Drawing Sheets

(51) Int. Cl.

| | | |
|---|---|---|
| G01S 1/00 | (2006.01) | |
| G01S 19/03 | (2010.01) | |
| H04L 12/24 | (2006.01) | |
| H04L 29/08 | (2006.01) | |
| G01C 21/34 | (2006.01) | |
| G01C 21/28 | (2006.01) | |
| H04W 4/021 | (2018.01) | |
| H04W 4/02 | (2018.01) | |

(52) U.S. Cl.
CPC ..... *G01C 21/3453* (2013.01); *G01C 21/3492* (2013.01); *H04L 67/1002* (2013.01); *H04L 67/12* (2013.01); *H04W 4/021* (2013.01); *H04W 4/027* (2013.01)

(58) Field of Classification Search
CPC ........... G01C 21/3415; G01C 21/3492; H04W 4/021; H04W 4/027
USPC .................................................. 709/206, 202
See application file for complete search history.

(56) References Cited

U.S. PATENT DOCUMENTS

| | | | |
|---|---|---|---|
| 5,164,904 A | 11/1992 | Sumner | |
| 5,173,691 A | 12/1992 | Sumner | |
| 5,247,439 A | 9/1993 | Gurmu | |
| 5,289,183 A | 2/1994 | Hassett | |
| 5,610,821 A | 3/1997 | Gazis et al. | |
| 6,115,611 A | 9/2000 | Kimoto | |
| 6,138,163 A | 10/2000 | Nam et al. | |
| 6,150,961 A | 11/2000 | Alewine et al. | |
| 6,317,058 B1 | 11/2001 | Lemelson et al. | |
| 6,480,783 B1 | 11/2002 | Myr | |
| 6,680,674 B1 | 1/2004 | Park | |
| 7,277,938 B2 | 10/2007 | Duimovich et al. | |
| 7,395,151 B2 | 7/2008 | O'Neill et al. | |
| 7,447,588 B1 | 11/2008 | Xu et al. | |
| 7,689,348 B2 | 3/2010 | Boss et al. | |
| 7,710,421 B2 | 5/2010 | Muramatsu | |
| 7,899,611 B2 | 3/2011 | Downs et al. | |
| 7,979,172 B2 | 7/2011 | Breed | |
| 8,000,887 B2 | 8/2011 | Nathan et al. | |
| 8,078,189 B2 * | 12/2011 | Chang | G01S 19/05 |
| | | | 455/456.1 |
| 8,280,451 B1 | 10/2012 | Zheng | |
| 8,396,652 B2 | 3/2013 | Nomura | |
| 8,428,876 B2 | 4/2013 | Lee | |
| 8,502,835 B1 | 8/2013 | Meehan | |
| 8,620,510 B1 | 12/2013 | Meuth et al. | |
| 8,768,012 B2 | 7/2014 | Satoh | |
| 8,799,246 B2 | 8/2014 | Nomura et al. | |
| 8,818,608 B2 | 8/2014 | Cullinane et al. | |
| 8,850,013 B2 | 9/2014 | Waldman et al. | |
| 8,862,146 B2 | 10/2014 | Shatsky et al. | |
| 8,903,431 B2 * | 12/2014 | Koch | H04L 67/22 |
| | | | 455/457 |
| 8,903,593 B1 | 12/2014 | Addepalli et al. | |
| 8,930,269 B2 | 1/2015 | He et al. | |
| 8,934,754 B2 * | 1/2015 | Billau | H04N 5/76 |
| | | | 386/226 |
| 8,988,252 B2 | 3/2015 | Scholl et al. | |
| 8,989,053 B1 * | 3/2015 | Skaaksrud | H04W 12/06 |
| | | | 370/255 |
| 8,995,662 B2 * | 3/2015 | Rubin | G08G 9/02 |
| | | | 380/255 |
| 9,041,812 B2 * | 5/2015 | Billau | G08B 13/19682 |
| | | | 348/143 |
| 9,058,703 B2 * | 6/2015 | Ricci | H04N 21/41422 |
| 9,154,909 B2 * | 10/2015 | Fulger | G08G 1/096775 |
| 9,384,609 B2 * | 7/2016 | Ricci | G06K 9/00255 |
| 9,494,439 B1 | 11/2016 | Ross | |
| 9,576,482 B2 | 2/2017 | Yamamoto | |
| 9,584,977 B2 | 2/2017 | Yamamoto | |
| 9,615,215 B2 * | 4/2017 | Yuen | A61B 5/6838 |
| 9,619,989 B1 * | 4/2017 | Ewing | G08B 21/245 |
| 9,640,073 B2 | 5/2017 | Gueziec | |
| 9,646,493 B2 | 5/2017 | Yamamoto | |
| 9,668,103 B1 | 5/2017 | Edwards | |
| 9,674,812 B2 * | 6/2017 | Skaaksrud | H04W 4/60 |
| 9,678,986 B2 * | 6/2017 | Hancock | G01C 21/32 |
| 9,681,104 B2 * | 6/2017 | Billau | H04N 7/162 |
| 9,868,394 B1 | 1/2018 | Fields et al. | |
| 9,868,446 B1 | 1/2018 | Zhu et al. | |
| 9,882,818 B2 | 1/2018 | Shao et al. | |
| 10,108,867 B1 | 10/2018 | Vallespi-Gonzalez | |
| 10,168,424 B1 | 1/2019 | Akiyama | |
| 10,262,529 B2 | 4/2019 | Yamamoto | |
| 10,275,796 B2 * | 4/2019 | Abuelsaad | G06Q 30/0266 |
| 10,339,810 B2 | 7/2019 | Akiyama | |
| 10,504,368 B2 | 12/2019 | Akiyama | |
| 10,535,266 B2 | 1/2020 | Akiyama | |
| 10,540,895 B2 | 1/2020 | Hosokawa | |
| 2001/0029425 A1 | 10/2001 | Myr | |
| 2002/0058520 A1 | 5/2002 | Nakagawa | |
| 2002/0161833 A1 | 10/2002 | Niven et al. | |
| 2003/0018428 A1 * | 1/2003 | Knockeart | G01C 21/3415 |
| | | | 342/357.31 |
| 2004/0024523 A1 * | 2/2004 | Uotani | G01C 21/3461 |
| | | | 701/411 |
| 2004/0225433 A1 * | 11/2004 | Burt | G01C 21/26 |
| | | | 701/200 |
| 2005/0027434 A1 | 2/2005 | Hirose | |
| 2005/0027447 A1 | 2/2005 | Hirose | |
| 2005/0065711 A1 | 3/2005 | Dahlgren et al. | |
| 2005/0070300 A1 * | 3/2005 | Caspi | H04W 4/02 |
| | | | 455/456.1 |
| 2005/0195821 A1 | 9/2005 | Yun et al. | |
| 2005/0222933 A1 | 10/2005 | Wesby | |
| 2005/0226165 A1 * | 10/2005 | Pope | G06F 13/10 |
| | | | 370/251 |
| 2005/0273250 A1 * | 12/2005 | Hamilton | G01C 21/3492 |
| | | | 701/532 |
| 2006/0106938 A1 * | 5/2006 | Dini | G06F 11/008 |
| | | | 709/228 |
| 2006/0158330 A1 | 7/2006 | Gueziec | |
| 2007/0067373 A1 | 3/2007 | Higgins et al. | |
| 2007/0109303 A1 | 5/2007 | Muramatsu | |
| 2007/0208496 A1 | 9/2007 | Downs | |
| 2007/0225912 A1 | 9/2007 | Grush | |
| 2007/0241932 A1 | 10/2007 | Otero et al. | |
| 2008/0046134 A1 | 2/2008 | Bruce et al. | |
| 2008/0114530 A1 | 5/2008 | Petrisor et al. | |
| 2008/0154629 A1 * | 6/2008 | Breed | B60N 2/2863 |
| | | | 705/1.1 |
| 2008/0156429 A1 | 7/2008 | Deckard | |
| 2008/0248815 A1 * | 10/2008 | Busch | G06Q 30/0233 |
| | | | 455/456.5 |
| 2008/0255754 A1 | 10/2008 | Pinto | |
| 2009/0070024 A1 | 3/2009 | Burchard et al. | |
| 2009/0176511 A1 * | 7/2009 | Morrison | G06Q 30/02 |
| | | | 455/456.3 |
| 2009/0248758 A1 | 10/2009 | Sawai et al. | |
| 2009/0254971 A1 | 10/2009 | Herz et al. | |
| 2009/0282125 A1 | 11/2009 | Jeide et al. | |
| 2009/0287405 A1 | 11/2009 | Liu et al. | |
| 2010/0011031 A1 * | 1/2010 | Huang | G06F 21/552 |
| | | | 707/E17.007 |
| 2010/0036595 A1 | 2/2010 | Coy et al. | |
| 2010/0063715 A1 | 3/2010 | Wynter et al. | |
| 2010/0069035 A1 * | 3/2010 | Johnson | H04W 4/02 |
| | | | 455/404.1 |
| 2010/0087981 A1 | 4/2010 | Orozco-Perez | |
| 2010/0100310 A1 | 4/2010 | Eich | |
| 2010/0188265 A1 | 7/2010 | Hill et al. | |
| 2010/0199213 A1 | 8/2010 | Suzuki | |
| 2010/0323715 A1 * | 12/2010 | Winters | G01S 5/0027 |
| | | | 455/456.1 |
| 2011/0037619 A1 | 2/2011 | Ginsberg et al. | |
| 2011/0047230 A1 * | 2/2011 | McGee | H04L 41/0609 |
| | | | 709/206 |
| 2011/0137557 A1 | 6/2011 | de los Reyes et al. | |

(56) References Cited

U.S. PATENT DOCUMENTS

| | | |
|---|---|---|
| 2011/0137881 A1* | 6/2011 | Cheng .................. H04W 4/021 707/706 |
| 2011/0191011 A1 | 8/2011 | McBride et al. |
| 2011/0205040 A1 | 8/2011 | Van Wiemeersch et al. |
| 2011/0208419 A1 | 8/2011 | Boss et al. |
| 2011/0285591 A1 | 11/2011 | Wong |
| 2011/0301770 A1* | 12/2011 | Rutman ................ B60L 11/182 700/292 |
| 2012/0035839 A1 | 2/2012 | Stehle et al. |
| 2012/0041675 A1 | 2/2012 | Juliver |
| 2012/0065871 A1 | 3/2012 | Deshpande et al. |
| 2012/0089326 A1 | 4/2012 | Bouve |
| 2012/0092187 A1 | 4/2012 | Scholl et al. |
| 2012/0136561 A1 | 5/2012 | Barker et al. |
| 2012/0291049 A1* | 11/2012 | Park ...................... G06F 9/5027 719/318 |
| 2013/0006925 A1 | 1/2013 | Sawai et al. |
| 2013/0079964 A1 | 3/2013 | Sukkarie |
| 2013/0096731 A1 | 4/2013 | Tamari |
| 2013/0141247 A1 | 6/2013 | Ricci |
| 2013/0204524 A1 | 8/2013 | Fryer et al. |
| 2013/0214939 A1 | 8/2013 | Washlow et al. |
| 2013/0305357 A1* | 11/2013 | Ayyagari .............. H04W 12/06 726/22 |
| 2013/0321397 A1 | 12/2013 | Chen et al. |
| 2013/0335233 A1 | 12/2013 | Kamar |
| 2013/0337830 A1* | 12/2013 | Haro .................... H04W 4/021 455/456.1 |
| 2014/0030788 A1 | 1/2014 | Chen |
| 2014/0032015 A1* | 1/2014 | Chun .................... G08G 1/166 701/2 |
| 2014/0075004 A1* | 3/2014 | Van Dusen ........ G06Q 30/0201 709/223 |
| 2014/0089243 A1* | 3/2014 | Oppenheimer .... G06K 7/10009 706/46 |
| 2014/0104077 A1 | 4/2014 | Engel et al. |
| 2014/0120953 A1 | 5/2014 | Ingram et al. |
| 2014/0136099 A1 | 5/2014 | Choi et al. |
| 2014/0191858 A1 | 7/2014 | Morgan et al. |
| 2014/0195214 A1 | 7/2014 | Kozloski et al. |
| 2014/0236414 A1 | 8/2014 | Droz et al. |
| 2014/0248899 A1 | 9/2014 | Emadzadeh et al. |
| 2014/0278026 A1 | 9/2014 | Taylor |
| 2014/0278029 A1 | 9/2014 | Tonguz et al. |
| 2014/0278074 A1 | 9/2014 | Annapureddy et al. |
| 2014/0289267 A1 | 9/2014 | Felix et al. |
| 2014/0306834 A1 | 10/2014 | Ricci |
| 2014/0344896 A1 | 11/2014 | Pak |
| 2014/0365644 A1 | 12/2014 | Tanaka |
| 2015/0051822 A1 | 2/2015 | Joglekar |
| 2015/0066284 A1 | 3/2015 | Yopp |
| 2015/0088835 A1 | 3/2015 | Davis |
| 2015/0120083 A1 | 4/2015 | Gurovich et al. |
| 2015/0149019 A1 | 5/2015 | Pilutti et al. |
| 2015/0160023 A1 | 6/2015 | Goel et al. |
| 2015/0179077 A1 | 6/2015 | Morgan et al. |
| 2015/0212642 A1 | 7/2015 | Kim |
| 2015/0279122 A1 | 10/2015 | Lorenzen |
| 2015/0333992 A1 | 11/2015 | Vasseur |
| 2015/0349917 A1* | 12/2015 | Skaaksrud ......... G06Q 10/0833 370/328 |
| 2015/0355805 A1 | 12/2015 | Chandler |
| 2015/0371352 A1 | 12/2015 | Boss et al. |
| 2016/0028632 A1 | 1/2016 | Vasseur |
| 2016/0042644 A1* | 2/2016 | Velusamy ............... H04W 4/70 340/435 |
| 2016/0048938 A1* | 2/2016 | Jones .................... H04L 41/065 705/7.28 |
| 2016/0061625 A1 | 3/2016 | Wang |
| 2016/0078756 A1 | 3/2016 | Basalamah |
| 2016/0112201 A1 | 4/2016 | Misawa et al. |
| 2016/0119419 A1 | 4/2016 | Choi |
| 2016/0125467 A1* | 5/2016 | Scott .................. G06Q 30/0261 705/14.58 |
| 2016/0133130 A1 | 5/2016 | Grimm et al. |
| 2016/0189044 A1 | 6/2016 | Pan |
| 2016/0203651 A1* | 7/2016 | Heath .................... G06Q 50/30 705/13 |
| 2016/0212601 A1 | 7/2016 | Braun et al. |
| 2016/0282129 A1* | 9/2016 | Wang .................. H04B 17/318 |
| 2016/0351053 A1 | 12/2016 | Jung et al. |
| 2016/0358479 A1 | 12/2016 | Riedelsheimer |
| 2016/0360485 A1 | 12/2016 | McGavran |
| 2016/0371864 A1* | 12/2016 | Gotoh .................... G06T 11/60 |
| 2016/0373449 A1 | 12/2016 | Haga et al. |
| 2016/0373896 A1 | 12/2016 | Yamamoto |
| 2017/0006430 A1* | 1/2017 | Chao .................... H04W 4/029 |
| 2017/0010111 A1 | 1/2017 | Gotoh et al. |
| 2017/0012812 A1 | 1/2017 | Gotoh et al. |
| 2017/0038218 A1* | 2/2017 | Kamata ............. G01C 21/3415 |
| 2017/0067764 A1 | 3/2017 | Skupin et al. |
| 2017/0084175 A1 | 3/2017 | Sedlik |
| 2017/0178505 A1 | 6/2017 | Ishikawa et al. |
| 2017/0213455 A1 | 7/2017 | Yamamoto |
| 2017/0221272 A1 | 8/2017 | Li |
| 2017/0228410 A1 | 8/2017 | Slusar |
| 2017/0278409 A1 | 9/2017 | Johnson |
| 2017/0352200 A1 | 12/2017 | Wang et al. |
| 2018/0005443 A1 | 1/2018 | Poulos |
| 2018/0022328 A1 | 1/2018 | Tochigi |
| 2018/0053404 A1 | 2/2018 | Horita et al. |
| 2018/0068495 A1 | 3/2018 | Chainer |
| 2018/0083914 A1 | 3/2018 | Yamaura |
| 2018/0170349 A1* | 6/2018 | Jobson ................. B60W 10/06 |
| 2018/0342113 A1 | 11/2018 | Kislovskiy |
| 2018/0372855 A1 | 12/2018 | Akiyama |
| 2018/0372856 A1 | 12/2018 | Akiyama |
| 2018/0374343 A1 | 12/2018 | Akiyama |
| 2018/0374344 A1 | 12/2018 | Akiyama |
| 2018/0374353 A1 | 12/2018 | Hosokawa |
| 2018/0374354 A1 | 12/2018 | Akiyama |
| 2018/0374355 A1 | 12/2018 | Hosokawa |
| 2018/0374356 A1 | 12/2018 | Akiyama |
| 2018/0374357 A1 | 12/2018 | Hosokawa |
| 2018/0374358 A1 | 12/2018 | Akiyama |
| 2019/0371976 A1 | 12/2019 | Kessels |

FOREIGN PATENT DOCUMENTS

| | | |
|---|---|---|
| CN | 102798854 A | 11/2012 |
| CN | 102997928 A | 3/2013 |
| CN | 103247176 A | 8/2013 |
| CN | 103258043 A | 8/2013 |
| CN | 103854072 A | 6/2014 |
| CN | 103971529 A | 8/2014 |
| DE | 10030819 A1 | 1/2002 |
| DE | 102005020154 A1 | 11/2006 |
| EP | 1914701 A2 | 4/2008 |
| JP | 11083511 A | 3/1999 |
| JP | 2001028004 A | 1/2001 |
| JP | 2003004468 A | 1/2003 |
| JP | 2007286706 A | 11/2007 |
| JP | 2008003928 A | 1/2008 |
| JP | 2008123197 A | 5/2008 |
| JP | 2008123325 A | 5/2008 |
| JP | 2008262418 A | 10/2008 |
| JP | 2008294921 A | 12/2008 |
| JP | 2009277078 A | 11/2009 |
| JP | 2011158339 A | 8/2011 |
| JP | 4985119 B2 | 7/2012 |
| JP | 2012150515 A | 8/2012 |
| JP | 2012155286 A | 8/2012 |
| JP | 2013045242 A | 3/2013 |
| JP | 2013101119 A | 5/2013 |
| JP | 2013101120 A | 5/2013 |
| JP | 2014065362 A | 4/2014 |
| JP | 2014075008 A | 4/2014 |
| JP | 2014095663 A | 5/2014 |
| JP | 2015018396 A | 1/2015 |
| JP | 2015081057 A | 4/2015 |
| KR | 101354607 B1 | 1/2014 |
| WO | 2007140527 A1 | 12/2007 |
| WO | 2011081157 A1 | 7/2011 |

(56) References Cited

FOREIGN PATENT DOCUMENTS

| WO | 2012167174 A1 | 12/2012 |
|---|---|---|
| WO | 2013167085 A2 | 11/2013 |
| WO | 2014166527 A1 | 10/2014 |

OTHER PUBLICATIONS

Gotoh et al., "Geographic Space Management," Application and Drawings, filed Jun. 19, 2015, p. 1-97, U.S. Appl. No. 14/744,052.
Gotoh et al., "Geographic Space Management," Application and Drawings, filed Jun. 25, 2015, p. 1-95, U.S. Appl. No. 14/750,298.
Gotoh et al., "Geographic Space Management," Application and Drawings, filed Jun. 25, 2015, p. 1-95, U.S. Appl. No. 14/750,334.
Gotoh et al., "Geographic Space Management," Application and Drawings, filed Jul. 8, 2015, p. 1-93, U.S. Appl. No. 14/793,934.
Gotoh et al., "Geographic Space Management," Application and Drawings, filed Jun. 19, 2015, p. 1-95, U.S. Appl. No. 14/744,056.
Gotoh et al., "Geographic Space Management," Application and Drawings, filed Jul. 16, 2015, p. 1-92, U.S. Appl. No. 14/800,774.
Gotoh et al., "Geographic Space Management," Application and Drawings, filed Jul. 16, 2015, p. 1-92, U.S. Appl. No. 14/800,782.
Gotoh et al., "Geographic Space Management," Application and Drawings, filed Jun. 19, 2015, p. 1-94, U.S. Appl. No. 14/744,066.
Gotoh et al., "Geographic Space Management," Application and Drawings, filed Jul. 16, 2015, p. 1-91, U.S. Appl. No. 14/800,795.
Gotoh et al., "Geographic Space Management," Application and Drawings, filed Jul. 16, 2015, p. 1-91, U.S. Appl. No. 14/800,811.
Gotoh et al., "Geographic Space Management," Application and Drawings, filed Jun. 19, 2015, p. 1-93, U.S. Appl. No. 14/744,067.
Gotoh et al., "Geographic Space Management," Application and Drawings, filed Jul. 16, 2015, p. 1-91, U.S. Appl. No. 14/800,821.
Gotoh et al., "Geographic Space Management," Application and Drawings, filed Jul. 16, 2015, p. 1-91, U.S. Appl. No. 14/800,839.
Gotoh et al., "Management of Moving Objects," Application and Drawings, filed Jun. 19, 2015, p. 1-46, U.S. Appl. No. 14/744,071.
Gotoh et al., "Management of Moving Objects," Application and Drawings, filed Jul. 17, 2015, p. 1-46, U.S. Appl. No. 14/802,289.
Gotoh et al., "Management of Moving Objects," Application and Drawings, filed Jul. 17, 2015, p. 1-46, U.S. Appl. No. 14/802,316.
Yamamoto, "Management of Moving Objects," Application and Drawings, filed Jun. 19, 2015, p. 1-59, U.S. Appl. No. 14/744,074.
Yamamoto, "Management of Moving Objects," Application and Drawings, filed Jul. 17, 2015, p. 1-58, U.S. Appl. No. 14/802,343.
Yamamoto, "Management of Moving Objects," Application and Drawings, filed Jul. 17, 2015, p. 1-58, U.S. Appl. No. 14/802,361.
Gotoh et al., "Management of Events and Moving Objects," Application and Drawings, filed Jul. 7, 2015, p. 1-69, U.S. Appl. No. 14/792,805.
Gotoh et al., "Management of Events and Moving Objects," Application and Drawings, filed Jul. 16, 2015, p. 1-68, U.S. Appl. No. 14/801,014.
Gotoh et al., "Management of Events and Moving Objects," Application and Drawings, filed Jul. 16, 2015, p. 1-68, U.S. Appl. No. 14/801,054.
Miyahira et al., "Management of Mobile Objects and Service Platform for Mobile Objects," Application and Drawings, filed Dec. 16, 2015, p. 1-69, U.S. Appl. No. 14/970,596.
Nishimura et al., "Management of Dynamic Events and Moving Objects," Application and Drawings, filed Dec. 16, 2015, p. 1-92, U.S. Appl. No. 14/970,600.
Ishikawa et al., "Management of Evacuation With Mobile Objects," Application and Drawings, filed Dec. 16, 2015, p. 1-50, U.S. Appl. No. 14/970,609.
Gotoh et al., "Geographic Space Management," Application and Drawings, filed Dec. 16, 2015, p. 1-72, U.S. Appl. No. 14/970,616.
Ishikawa et al., "Management of Mobile Objects and Resources," Application and Drawings, filed Dec. 16, 2015, p. 1-52, U.S. Appl. No. 14/970,626.
Gotoh et al., "Management of Mobile Objects," Application and Drawings, filed Dec. 16, 2015, p. 1-65, U.S. Appl. No. 14/970,631.
Ishikawa et al., "Management of Mobile Objects," Application and Drawings, filed Dec. 16, 2015, p. 1-78, U.S. Appl. No. 14/970,643.
IEEE, "Server—Definition," IEEE 100: The Authoritative Dictionary of IEEE Standards Terms, 2000, p. 1031, Seventh Edition.
IEEE, "System—Definition," IEEE 100: The Authoritative Dictionary of IEEE Standards Terms, 2000, p. 1143-1144, Seventh Edition.
Pawlowski et al., "Applying Event Stream Processing on Traffic Problem Detection," Progress in Artificial Intelligence (EPAI), 2009, p. 27-38, LNAI vol. 5816, Springer-Verlag Berlin Heidelberg.
Y et al., "A Complex Event Processing System Approach to Real Time Road Traffic Event Detection," Journal of Convergence Information Technology (JCIT), Oct. 2013, p. 142-148, vol. 8, No. 15.
IBM, "List of IBM Patents or Patent Applications Treated as Related (Appendix P)," Aug. 12, 2015, p. 1-3.
Gotoh et al., "Geographic Space Management," filed Jun. 25, 2015, p. 1-97, U.S. Appl. No. 14/744,052.
Gotoh et al., "Geographic Space Management," filed Jun. 25, 2015, p. 1-95, U.S. Appl. No. 14/750,298.
Gotoh et al., "Geographic Space Management," filed Jun. 25, 2015, p. 1-95, U.S. Appl. No. 14/750,334.
Gotoh et al., "Geographic Space Management," filed Jul. 8, 2015, p. 1-93, U.S. Appl. No. 14/793,934.
Gotoh et al., "Geographic Space Management," filed Jun. 19, 2015, p. 1-95, U.S. Appl. No. 14/744,056.
Gotoh et al., "Geographic Space Management," filed Jul. 16, 2015, p. 1-92, U.S. Appl. No. 14/800,774.
Gotoh et al., "Geographic Space Management," filed Jul. 16, 2015, p. 1-92, U.S. Appl. No. 14/800,782.
Gotoh et al., "Geographic Space Management," filed Jun. 19, 2015, p. 1-94, U.S. Appl. No. 14/744,066.
Gotoh et al., "Geographic Space Management," filed Jul. 16, 2015, p. 1-91, U.S. Appl. No. 14/800,795.
Gotoh et al., "Geographic Space Management," filed Jul. 16, 2015, p. 1-91, U.S. Appl. No. 14/800,811.
Gotoh et al., "Geographic Space Management," filed Jun. 19, 2015, p. 1-93, U.S. Appl. No. 14/744,067.
Gotoh et al., "Geographic Space Management," filed Jul. 16, 2015, p. 1-91, U.S. Appl. No. 14/800,821.
Gotoh et al., "Geographic Space Management," filed Jul. 16, 2015, p. 1-91, U.S. Appl. No. 14/800,839.
Gotoh et al., "Management of Moving Objects," filed Jun. 19, 2015, p. 1-46, U.S. Appl. No. 14/744,071.
Gotoh et al., "Management of Moving Objects," filed Jul. 17, 2015, p. 1-46, U.S. Appl. No. 14/802,289.
Gotoh et al., "Management of Moving Objects," filed Jul. 17, 2015, p. 1-46, U.S. Appl. No. 14/802,316.
Yamamoto, "Management of Moving Objects," filed Jun. 19, 2015, p. 1-59, U.S. Appl. No. 14/744,074.
Yamamoto, "Management of Moving Objects," filed Jul. 17, 2015, p. 1-58, U.S. Appl. No. 14/802,343.
Yamamoto, "Management of Moving Objects," filed Jul. 17, 2015, p. 1-58, U.S. Appl. No. 14/802,361.
Gotoh et al., "Management of Events and Moving Objects," filed Jul. 7, 2015, p. 1-69, U.S. Appl. No. 14/792,805.
Gotoh et al., "Management of Events and Moving Objects," filed Jul. 16, 2015, p. 1-68, U.S. Appl. No. 14/801,014.
Gotoh et al., "Management of Events and Moving Objects," filed Jul. 16, 2015, p. 1-68, U.S. Appl. No. 14/801,054.
International Search Report and Written Opinion for International Application No. PCT/IB2016/053523, International Filing Date: Jun. 15, 2016, dated Sep. 21, 2016, pp. 1-11.
IBM, "List of IBM Patents or Patent Applications Treated as Related (Appendix P)," Jul. 17, 2017, p. 1-2.
U.S. Appl. No. 15/628,762, entitled "Management of Mobile Objects", filed Jun. 21, 2017, 69 Pages.
U.S. Appl. No. 15/628,787, entitled "Management of Mobile Objects", filed Jun. 21, 2017, 69 Pages.
U.S. Appl. No. 15/628,815, entitled "Management of Mobile Objects", filed Jun. 21, 2017, 74 pages.
U.S. Appl. No. 15/629,089, entitled "Management of Mobile Objects", filed Jun. 21, 2017, 72 Pages.

(56) References Cited

OTHER PUBLICATIONS

U.S. Appl. No. 15/628,828, entitled "Management of Mobile Objects", filed Jun. 21, 2017, 71 Pages.
U.S. Appl. No. 15/628,797, entitled "Management of Mobile Objects", filed Jun. 21, 2017, 72 Pages.
U.S. Appl. No. 15/483,415, entitled "Management of Moving Objects", filed Apr. 10, 2017, 59 Pages.
Abrougui et al., "Efficient load balancing and QoS-based location aware service discovery protocol for vehicular ad hoc networks," EURASIP Journal on Wireless Communications and Networking, Mar. 2012, p. 1-15, Springer.
Aulinas et al., "Local map update for large scale SLAM," Electronics Letters, Apr. 15, 2010, p. 1-2, vol. 46, No. 8.
Dangel et al., "Can Road Traffic Volume Information Improve Partitioning for Distributed SUMO?," Modeling Mobility with Open Data, Lecture Notes in Mobility, 2015, p. 61-74, Springer International Publishing.
DRM, "Local Dynamic Map," DRM Research Seminar, Jun. 30, 2010, p. 1-72, Japan Digital Road Map Association.
Hong et al., "A grid-based node split algorithm for managing current location data of moving objects," The Journal of Supercomputing, Dec. 2007, p. 321-337, vol. 42, Issue 3, Springer.
Hsu et al., "Automatic Traffic Monitoring Method Based on Cellular Model," Fifth International Conference on Intelligent Information Hiding and Multimedia Signal Processing, 2009, p. 640-643, IEEE Computer Society.
Ihm et al., "Advanced Spatial Data Management for Enterprise Applications," An Oracle White Paper, Aug. 2010, p. 1-16, Oracle Spatial 11g.
OpenStreetMap, "QuadTiles," OpenStreetMap Wiki, Last Modified on Mar. 3, 2014, p. 1-10, http://wiki.openstreetmap.org/wiki/QuadTiles, Accessed on Jun. 15, 2015.
Ortelli, "Server-side clustering of geo-points on a map using Elasticsearch," Trifork Blog, Aug. 1, 2013, p. 1-14, http://blog.trifork.com/2013/08/01/server-side-clustering-of-geo-points-on-a-map-using-elasticsearch/, Accessed on Jun. 15, 2015.
Schade, "Sharing Data by Means of a Local Dynamic Map," Understanding the Standards for Cooperative ITS, Feb. 6, 2014, p. 1-10, MINES ParisTech, Transportation Sustainability Environment Consulting.
Suzumura et al., "X10-based Massive Parallel Large-Scale Traffic Flow Simulation," ProVISION, Winter 2012, p. 74-79, No. 72, IBM Professionals' Papers.
Yang et al., "Spatio-temporal Coupled Bayesian Robust Principal Component Analysis for Road Traffic Event Detection," Proceedings of the 16th International IEEE Annual Conference on Intelligent Transportation Systems (ITSC 2013), Oct. 6-9, 2013, p. 392-398, IEEE, The Hague, The Netherlands.
Merriam-Webster Dictionary, "Candidate", 2017, p. 1.
Microsoft Computer Dictionary, "Object" 5th Edition, 2002, p. 372.
Pending U.S. Appl. No. 15/903,084, filed Feb. 23, 2018, entitled: "Management of Mobile Objects", pp. 1-69.
IBM: List of IBM Patents or Patent Applications Treated as Related (Appendix P), Mar. 2, 2018, pp. 1-2.
Pending U.S. Appl. No. 15/855,408, filed Dec. 27, 2017, entitled: "Management of Mobile Objects", pp. 1-68.
Pending U.S. Appl. No. 15/855,238, filed Dec. 27, 2017, entitled: "Management of Mobile Objects", pp. 1-71.
Pending U.S. Appl. No. 15/855,159, filed Dec. 27, 2017, entitled: "Management of Mobile Objects", pp. 1-69.
Dictionary.com, "pertain", 2018, p. 1.
Microsoft Computer Dictionary, 5th Edition, 2002, p. 228, "function".
International Searching Authority, "Notification of Transmittal of the International Search Report and the Written Opinion of the International Searching Authority, or the Declaration," Patent Cooperation Treaty, dated Oct. 17, 2018, 31 Pages, International Application No. PCT/IB2018/0054408.
International Searching Authority, "Notification of Transmittal of the International Search Report and the Written Opinion of the International Searching Authority, or the Declaration," Patent Cooperation Treaty, dated Oct. 17, 2018, 9 Pages, International Application No. PCT/IB2018/0054409.
IBM: List of IBM Patents or Patent Applications Treated as Related (Appendix P), Feb. 28, 2020, 2 pages.
Pending U.S. Appl. No. 16/778,559, entitled "Management of Mobile Objects", filed Jan. 31, 2020, 76 Pages.

* cited by examiner

Event List

| Edge ID | Event ID | Location | Event Content | Influence Event |
|---|---|---|---|---|
| Edge 0001 | Eve 0214 | Full Length | Speed Limited to 30km/h | Eve 0114(Edge 0002) |
| Edge 0002 | Eve 0114 | 32m from the 1st node | Closure | Eve 0214(Edge 0001), Eve 0421(Edge 0003)... |
| ...... | ...... | ...... | ...... | ...... |
| Edge 1000 | N/A | : | : | Eve 1201 (edge xxxx) |

*FIG.13*

| Edge ID | Rule | Counts | Location | Event Content |
|---|---|---|---|---|
| Edge 0009 | Rule 1 | 2 | Full length | Congestion |
| Edge 0013 | Rule 1 | 1 | 15m from the 2$^{nd}$ node | Skid |
| ... | ... | ... | ... | ... |

Event Candidate List

FIG.14

Notification Event List

| Edge ID | Event ID | Location | Event Content |
|---|---|---|---|
| Edge 0001 | Eve 0214 | Full Length | Speed Limited to 30km/h |
| Edge 0002 | Eve 0114 | 32m from the 1st node | Closure |

*FIG.15*

MANAGEMENT OF EVENTS AND MOVING OBJECTS

BACKGROUND

The present invention relates to a system for managing moving objects and events in a geographic space.

As a large number of automobiles and events on the geographic space are expected to be managed by the system, the system has to process a great deal of information. Since cars generally move at high speed and require the latest information, it is desirable to complete all processes of a driving system within one server in order to minimize processing time for individual automobiles.

However, as the geographic space being handled by such a system expands, the amount of information being transmitted and received increases due to an increase in the number of automobiles and the number of roads, and the corresponding requirements might exceed the processing power of a single server. Even if the geographic space is divided and a plurality of servers are used to process the spaces resulting from the division, automobiles move at high speeds among the plurality of divided geographic spaces, and therefore further communication between the servers is necessary, such that the communication load between servers increases. The increase of the communication load between the servers prevents the system from processing each automobile in a short time. Therefore, a system to enable less communication load between servers and higher scalability is further needed for efficiently managing large scale geographic spaces.

Furthermore, rules for detecting traffic events on the geographic space may differ depending on locations of the events. A system to efficiently handle these different rules is needed.

SUMMARY

A first aspect of the invention herein provides a system comprising: an event server including a plurality of event agents for handling events occurring in a geographic space; a selector operable to select an event agent among the plurality of event agents for handling an event based on a type of a source information occurred in the geographic space; and a mobile object server including a mobile object agent assigned to a moving object in the geographic space, wherein the mobile object server is operable to execute the mobile object agent to collect information of the event from the selected event agent and provide the moving object with information that assists the moving object with traveling in the geographic space.

A second aspect of the invention may include a computer-implemented method performed by the system of the first aspect. A third aspect of the invention may include a computer program product comprising a non-transitory computer readable storage medium having program instructions embodied therewith, the program instructions executable by a computer to cause the computer to perform the method of the second aspect.

BRIEF DESCRIPTION OF THE SEVERAL VIEWS OF THE DRAWINGS

FIG. 13 shows an illustrative example of an event list, according to an embodiment of the present invention.

FIG. 14 shows an illustrative example of an event candidate list, according to an embodiment of the present invention.

FIG. 15 shows an illustrative example of a notification event list, according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
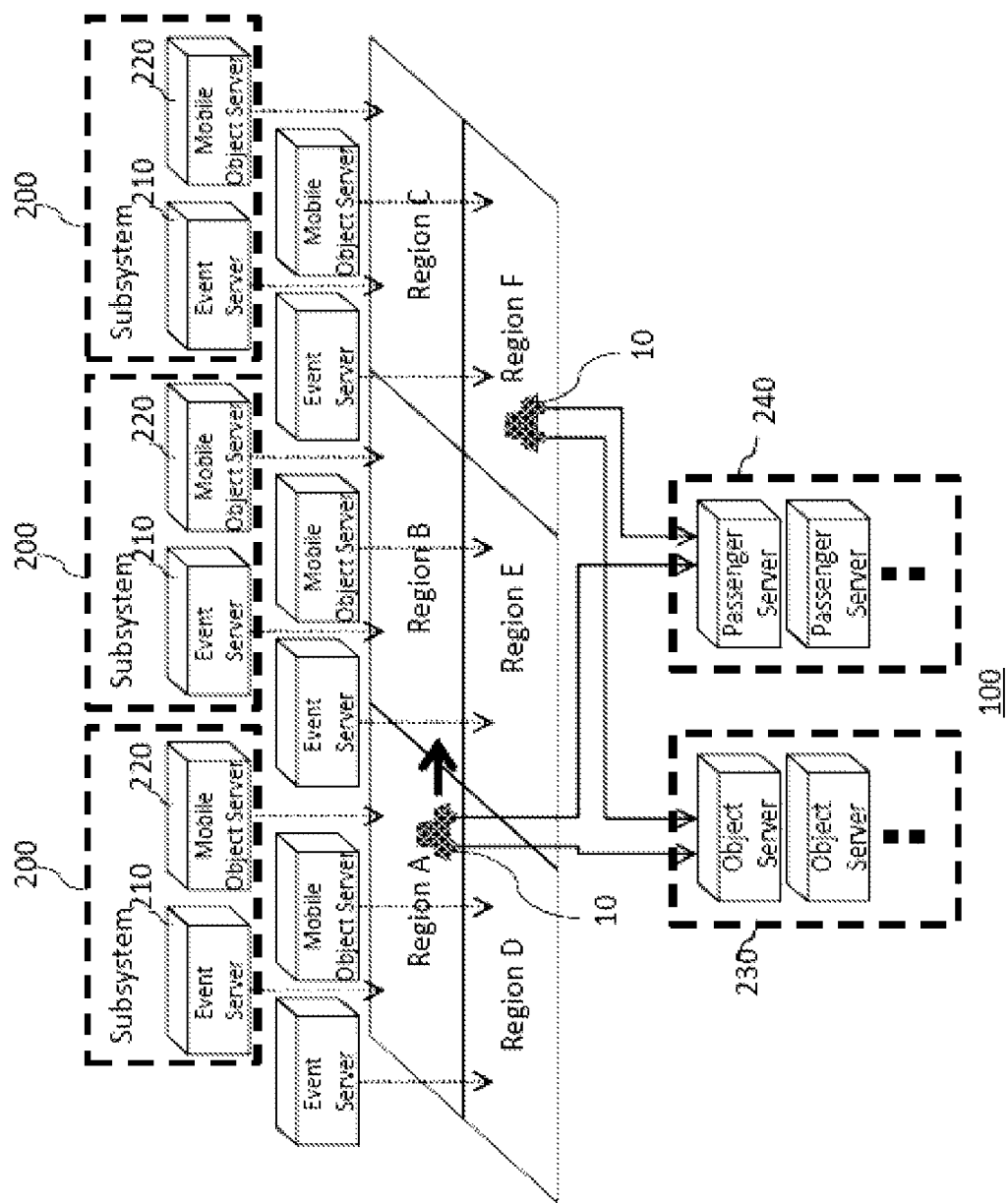
FIG. 1 shows a system 100 and a map area corresponding to a geographic space managed by the system 100, according to an embodiment of the present invention.

FIG. 1 shows a system 100 and a map area corresponding to a geographic space managed by the system 100, according to an embodiment of the present invention. The system 100 manages a geographic space that includes routes on which a moving object 10 moves. The system 100 is operable to divide the geographic space into a plurality of regions and manage these regions. A moving object 10 may move on routes including land routes, sea routes, and/or air routes, for example. The geographic space may be land, sea, or air space that includes the routes on which the moving object travels. The moving objects 10 may be manned/unmanned automobiles, motorbikes, bicycles, humans having a digital device, airplanes, vessels, drones, or the like.

FIG. 1 shows an automobile as an example of the moving object 10, which moves along roads as examples of land routes. The system 100 includes a plurality of subsystems 200 that respectively manage the plurality of regions. FIG. 1 shows an example in which the map area is divided into six regions from region A to region F, and six subsystems 200 respectively manage these six regions.

System 100 comprises a plurality of event servers 210, a plurality of mobile object servers 220, a plurality of object servers 230, and a plurality of passenger servers 240. According to the embodiment of FIG. 1, each of the subsystems 200 may include at least one of the plurality of event servers 210 and one of the plurality of mobile object servers 220.

The event server 210 manages events occurring in each region of the geographic space. In one embodiment, the event server 210 of subsystem 200 assigned to region A may manage events in region A. The plurality of mobile object servers 220 respectively assigned to a plurality of regions in a geographic space manage the moving objects 10 in each of the plurality of regions. In one embodiment, the mobile object server 220 assigned to region A may manage moving objects 10 located in region A. The object server 230 manages information of the moving objects 10 regardless of the location of the moving objects 10. The passenger server 240 manages information of at least one passenger riding on the moving objects 10.

Each of the subsystems 200 may be implemented on one or more servers. In one embodiment, each event server 210 and mobile object server 220 may be implemented on one server. In one embodiment, a set of an event server 210 and a mobile object server 220 in a subsystem 200 may be implemented by one server. Portions of the system 100 other than the subsystems 200 may also be implemented on one or more servers. In one embodiment, each object server 230 and passenger server 240 may be implemented on one server. In another embodiment, a set of object servers 230 and a set of passenger servers 240 may be each implemented by one server. In yet another embodiment, all of the object servers 230 and the passenger servers 240 may be implemented on one server. These servers may exist at any point on a network including the Internet, a subscriber network, a cellular network, or a desired combination of networks. The servers may be computers or other types of data processors, and may be dedicated servers, or may be shared servers that perform other operations.

The system 100 acquires the positions of a moving object 10 from the moving object 10, and the mobile object server 220 managing the region that includes the acquired position of the moving object 10 may manage the movement of this moving object 10. The system 100 acquires information of events that have occurred to the moving object 10 and/or on the road outside, and the event server 210 managing the region including the position where such an event has occurred may manage the state of the event.

This event may include information about accidents, obstructions, closure, limitation, status (e.g., slippery, icy, broken, under repair, etc.), traffic regulation, or construction on the road, or information about the weather, temperature, buildings, shops, or parking lots near the road. In response to a setting or a request from the moving object 10, the subsystem 200 may provide notification about the event information to the moving object 10 that made the request. For example, if the moving object 10 is moving on a route in a geographical area corresponding to region A, then the mobile object sever 220 managing region A provides this moving object 10 with the notification about the event relating to the route.

Since the map area is divided into a plurality of regions, despite the moving object 10 simply moving on a route, the region corresponding to the position of the moving object 10 might change. FIG. 1 shows an example in which the moving object 10 is driving on a road such that the position of the moving object 10 moves from region A to region B on the regions. In this case, according to the movement of the moving object 10, the system 100 may transfer the information concerning the moving object 10 from the mobile object server 220 managing region A to the mobile object server 220 managing region B, and may also transfer the management of the moving object 10 to the mobile object server 220 managing region B.

Figure 2:
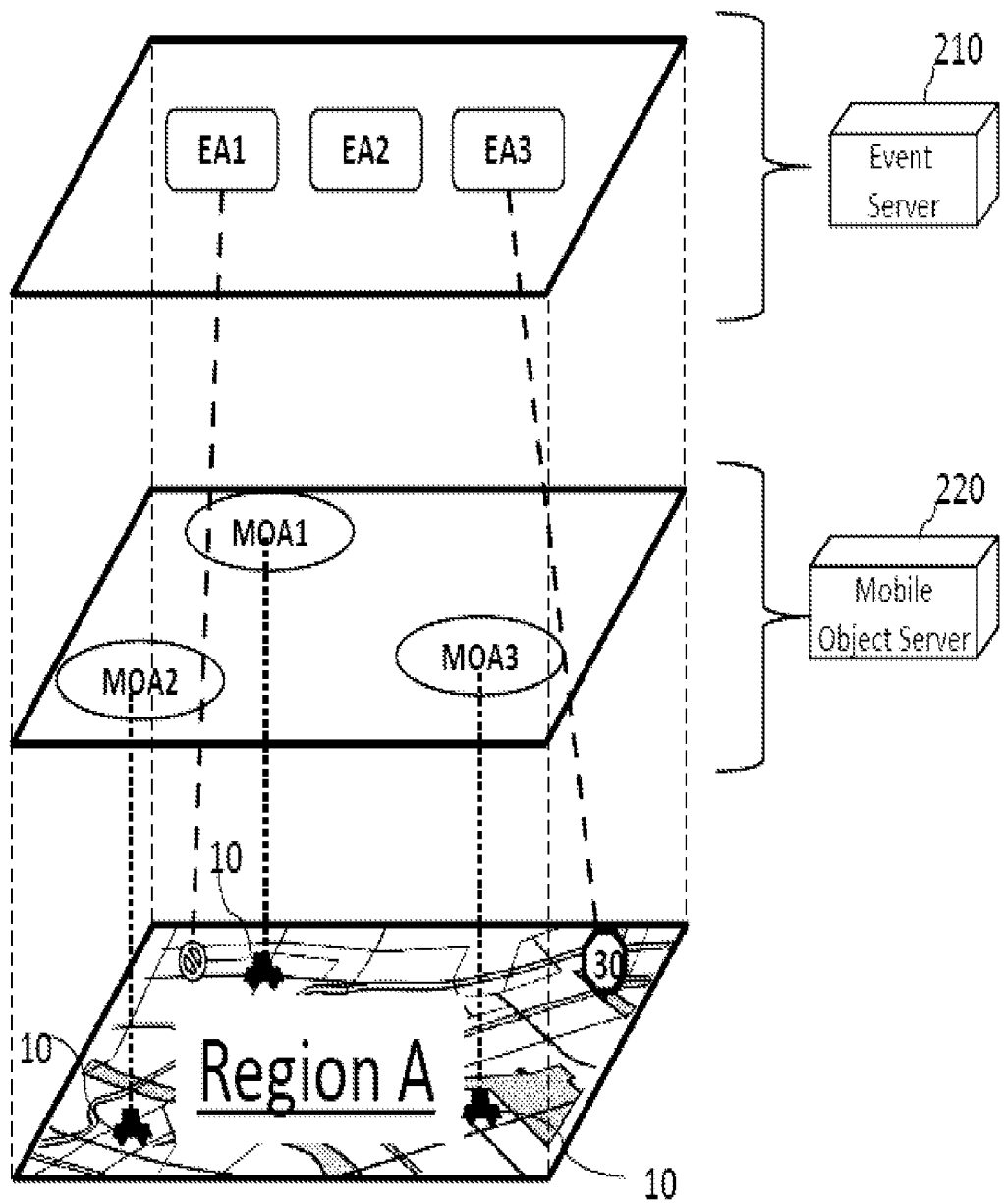
FIG. 2 shows a subsystem 200 and a map area corresponding to a region A managed by the subsystem 200, according to an embodiment of the present invention.

FIG. 2 shows a subsystem 200 and a map area corresponding to a region A managed by the subsystem 200, according to an embodiment of the present invention. The event server 210 includes and manages a plurality of event agents for handling events occurring in the geographic space, and executes each event agent to manage events on routes in a region assigned to the event server 210. An "agent" may be a software entity having specific data, and may operable to receive a message (e.g. command), and return a result of the message. In this embodiment, the region assigned to the event server 210 is the same as the region assigned to the mobile object server 220. However, in other embodiments, these regions may be different.

In the embodiment of FIG. 2, the event server 210 executes each of the event agents EA1-EA3 to manage events occurring on routes of a region A. The event agents EA1-EA3 may be assigned different types of events by handling different event detection rules. For example, the event agent EA1 may manage a type of event (e.g., "slippery road"), and the event agent EA3 may manage another type of event (e.g., "speed limit") as shown in FIG. 2. Event agents are explained in further detail below. At least one of the event agents may be assigned to handle events of a portion of the region A (a portion of routes (also known as edges) in the region A, or a divided area of the region A). For example, one event agent may handle all or part of the events occurring in one portion.

The plurality of mobile object servers of the system may include at least one mobile object server 220 including a plurality of mobile object agents, each of which is assigned to a moving object 10 in the geographic space. In the embodiment of FIG. 2, the mobile object server 220 includes three mobile object agents MOAs 1-3 assigned to three moving objects 10 in the assigned region A. The mobile object server 220 executes each of the mobile object agents MOA1-MOA3 to manage the moving objects 10 traveling on the region A.

Figure 3:
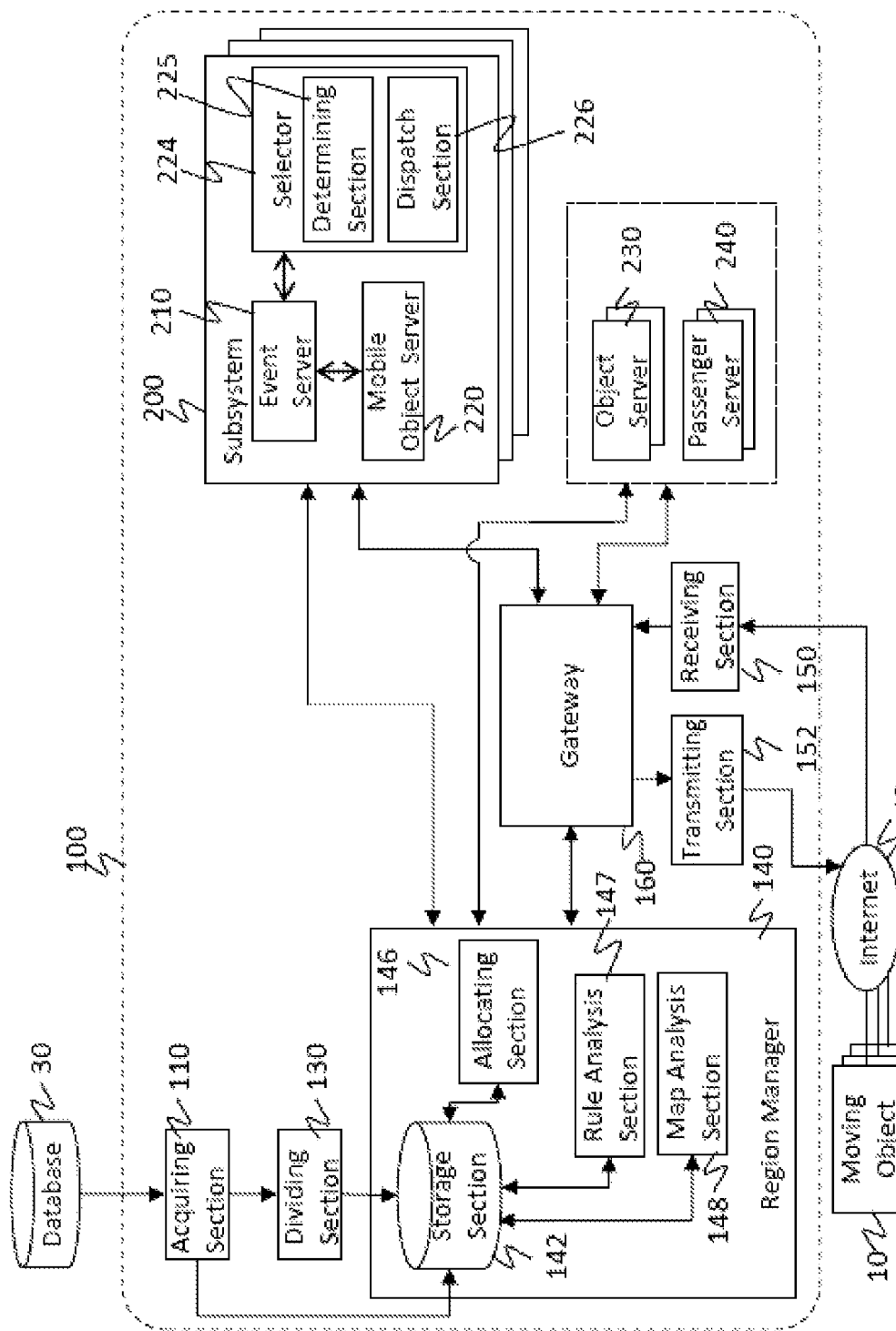
FIG. 3 shows a first exemplary configuration of the system 100, according to an embodiment of the present invention.

FIG. 3 shows an exemplary configuration of the system 100, according to an embodiment of the present invention. The system 100 may be operable to communicate with each of a plurality of moving objects 10 to send and receive the information used to manage the moving objects 10. The system 100 may be operable to acquire map data and/or information exchanged with the moving objects 10, through the Internet, a subscriber network, a cellular network, or any desired combination of networks. The system 100 includes an acquiring section (i.e., module) 110, a dividing section 130, a region manager 140, a receiving section 150, a transmitting section 152, a gateway apparatus 160, a plurality of subsystems 200, a plurality of object servers 230, and a plurality of passenger servers 240.

The acquiring section 110 may be operable to acquire map data corresponding to the geographical areas where a moving object 10 is positioned, from an external database 30, for example. In response to the map being updated, the acquiring section 110 may acquire some or all of the updated map data. The acquiring section 110 may be operable to acquire the map data from the Internet, a subscriber network, a cellular network, or any desired combination of networks. The system 100 may be operable to store the map data in advance.

The acquiring section 110 may further acquire an event that has occurred within the geographic space to be managed by the system 100. In this case, the acquiring section 110 may acquire accident information, traffic information, weather information, time information, etc. from external database 30 or other external entity.

The acquiring section 110 may further acquire event detection rules, according to which event candidates may be generated, from external database 30 or other external entity. In one embodiment, the acquiring section 110 may provide with the dividing section 130 with the map data and region manager 140 with the data of the events and/or the event detection rules.

The dividing section 130 may be operable to communicate with the acquiring section 110 and divide the map area into a plurality of regions. In one embodiment, the dividing section 130 generates a plurality of regions by dividing an original map area into a plurality of regions.

The region manager 140 may be operable to store information concerning the plurality of regions including the regions resulting from the division. The region manager 140 may be operable to specify the subsystem 200 managing the region that includes the position of the moving object 10, in response to receiving the position of the moving object 10. The region manager 140 may be implemented on one or more servers. In the embodiment of FIG. 3, the region manager 140 comprises a storage section 142, an allocating section 146, a rule analysis section 147, and a map analysis section 148.

The storage section 142 may be operable to communicate with the dividing section 130 and store information concerning the plurality of first regions and the plurality of second regions resulting from the division by the dividing section 130. The storage section 142 may be operable to communicate with the acquiring section 110 and store information concerning events occurring in the geographic space and/or information concerning the event detection rules. The storage section 142 may store setting values or the like of the system 100, and other necessary information of the system 100.

The storage section 142 may store intermediate data, calculation results, threshold values, parameters, and the like that are generated by or used in the operations of the system 100. In response to a request from any component within the system 100, the storage section 142 may supply the data stored therein to the component making the request. The storage section 142 may be a computer readable storage medium such as an electric storage device, a magnetic storage device, an optical storage device, an electromagnetic storage device, or a semiconductor storage device.

The allocating section 146 may be operable to communicate with the storage section 142, and determine one region from the plurality of regions (e.g., regions A-F of FIG. 1) in which each of the moving objects 10 is located based on the position information of the moving object 10 and geographic information of the plurality of regions. The allocating section 146 may identify a route or position in the map area managed by the system 100 that corresponds to the position information of the moving object 10.

The allocating section 146 may store the position information of this moving object 10 and/or information of the determined region in the storage section 142, in association with this moving object 10. The allocating section 146 may store a history of the position information of this moving object 10 and/or a history of the determined mobile object server 220 in the storage section 142. The allocating section 146 may be a circuit, a shared or dedicated computer readable medium storing computer readable program instructions executable by a shared or dedicated processor, etc.

The rule analysis section 147 may analyze event detection rules to select a type of event agent for processing the event detection rules. In one embodiment, the rule analysis section 147 may determine a characteristic type of event detection rules. In the embodiment, the rule analysis section may determine an event detection rule as a "short time type" or a "long time type" based on the analysis of the event detection rule. The rule analysis section 147 may further determine a location type of event detection rules. In the embodiment, the rule analysis section may determine an event detection rule as an "urban type" or a "suburban type" based on the analysis of the event detection rule. The rule analysis section 147 may select the type of the event agent for processing existing or new event detection rules. The rule analysis section 147 may further prepare event agents for processing each type of event agent. The rule analysis section 147 may store the result of the selection of the type and the preparation of the event agents.

The map analysis section 148 may analyze a map of the geographic space and assign a location type of the event agent to portions (e.g., route(s) in a region, and/or, area(s) corresponding to the division from a region) within the geographic space based on a geographic characteristic of the area(s) or a geographic characteristic of the route(s). In one embodiment, the map analysis section 148 may assign "urban type" to a portion of a region and assign "suburban type" to another portion of the region. In one embodiment, the map analysis section 148 may assign each of the event detection rules and each of the portions of the geographic space to each of the event agents based on the location type and the characteristic type of the event detection rule, the type of the event agents, and the location type of the portions. The map analysis section 148 may generate an agent mapping table based on the assignment. The map analysis section 148 may store the result of the analysis in the storage section 142.

The receiving section 150 may be operable to receive information transmitted from each of a plurality of moving objects 10. Each moving object 10 may transmit information at designated time intervals, and the receiving section 150 may sequentially receive this transmitted information. In this embodiment, the receiving section 150 may receive car probe data from each moving object 10 as the information. The car probe data may include information detected by the moving object 10, such as position information of the moving object 10.

In one embodiment, the position information may include longitude and latitude (and optionally altitude information) of the moving object 10 in an absolute coordinate system. In another embodiment, the moving object 10 may determine its location in the absolute coordinate system by using GPS, and the allocating section 146 receiving the position information may determine a route on which the moving object 10 exists and a specific location of the route at which the moving object 10 exists based on the position information.

Alternatively, the moving object 10 may include such detailed position information in the car probe data.

The receiving section 150 may communicate with the plurality of moving objects 10 and receive the car probe data of each moving object 10, via the Internet 40. The receiving section 150 may receive the car probe data of the plurality of moving objects 10 through wireless communication, a subscriber network, a cellular network, or any desired combination of networks.

The transmitting section 152 may be operable to transmit event information to each of the moving objects 10 according to settings, for example. The transmitting section 152 may transmit information concerning the route on which the moving object 10 is expected to travel. The transmitting section 152 may communicate with the moving objects 10 and transmit each type of information to the moving objects 10 via the Internet 40. The transmitting section 152 may transmit each type of information to the moving objects 10 through wireless communication, a subscriber network, a cellular network, or any desired combination of networks.

The gateway apparatus 160 may be operable to transfer communication between the plurality of subsystems 200 and the plurality of moving objects 10. The gateway apparatus 160 may communicate with the receiving section 150 and receive the information transmitted by each moving object 10.

The gateway apparatus 160 may communicate with the region manager 140 and demand the transfer destination for each piece of information received from the moving objects 10, of the region manager 140. In response to this request, the gateway apparatus 160 may receive from the region manager 140 the information of the subsystem 200 managing the region on which the moving object 10 exists. The gateway apparatus 160 may transfer the information received from the moving object 10 to the subsystem 200 that is to manage the moving object 10. In other words, the gateway apparatus 160 may transfer the information received from each moving object 10 to the subsystem 200 determined by the region manager 140.

The gateway apparatus 160 may communicate with each of the subsystems 200, and receive the information transmitted by each subsystem 200. The gateway apparatus 160 may communicate with the transmitting section 152 and supply the transmitting section 152 with the information received from each subsystem 200, such that this information is transferred to the moving objects 10 designated for each subsystem 200.

The gateway apparatus 160 may include a plurality of gateway devices, and may quickly perform transfer between the plurality of subsystems 200 and the plurality of moving objects 10. In this case, the receiving section 150 may function as a load balancer that supplies the information from the moving objects 10, such that the load is spread among the plurality of gateways. The load balancer may sequentially supply information from the moving objects 10 to the gateways having lighter loads. The gateway apparatus 160 may be a network that provides a connection between a plurality of networks using the same or different types of protocols.

A plurality of subsystems 200 may be operable to communicate with the region manager 140 and the gateway apparatus 160 and to respectively manage a plurality of regions in a geographic space. Each subsystem 200 is operable to manage moving objects 10 that travel routes in its managing region and to manage events on its managing region.

As described, each subsystem 200 may include the event server 210 and the mobile object server 220. Each subsystem may further include a selector 224.

The event server 210 manages events occurring on its managing region with the plurality of the event agents. In one embodiment, the event server 210 may perform, through the event agent, (i) registration, update and/or deletion of events, (ii) registration, update and/or deletion of event candidates, and (iii) provision of event information. In one embodiment, the event server 210 may store a plurality of event detection rules, which are respectively assigned to a plurality of event agents. The event server 210 may receive source information from the selector 224. The source information may be used for generation of the event candidate, and include the information from the moving object 10, such as the car probe data of a moving object 10. The event server 210 may detect an event candidate based on the source information using the event detection rule assigned to the event agent, and detect an event based on density of the event candidate.

The mobile object server 220 manages the plurality of the moving objects 10 traveling on its managing region with the plurality of the mobile object agents. In one embodiment, the mobile object server 220 may perform, through the mobile object agent, (i) processing of the car probe data, (ii) update of information of the mobile object, and (iii) provision of information to the mobile object. For example, the mobile object server 220 may execute the mobile object agent to collect information of events from at least one event server 210, and provide the moving object 10 with information that assists the moving object 10 with traveling in the geographic space.

The selector 224 may select an event agent among the plurality of event agents of the event server 210 for handling an event candidate. The event candidate may be a candidate of an event, which the event server 210 may detect from source information. The selector 224 may comprise a determining section 225 and a dispatch section 226.

The determining section 225 may determine a type of the source information. The type of the source information may be "urban type" event candidate, "suburban type" event candidate, and etc. The determining section 225 may further determine which event detection rule(s) from the plurality of event detection rules to apply to the source information based on the type of the source information. The determining section 225 may read map data of the corresponding region stored in the storage section 142 for determining the event detection rule(s).

The dispatch section 226 may dispatch the source information to an event agent of the event server 210, which is assigned to the event detection rule determined by the determining section 225. The dispatch section 226 may determine the event agent for dispatching the source information by referring to the agent mapping table in the storage section 142. Thereby, the dispatch section 226 may enable the selected event agent to process the source information by the appropriate event agent.

A plurality of object servers 230 including at least one object server 230 may communicate with the gate way 160 and include an object agent (OA) containing information of the moving object 10. An object agent may correspond to each moving object 10 and contain information thereof. In one embodiment, the object agent may contain (i) information, by region, of which subsystem currently manages a mobile object agent of the moving object 10, (ii) an identification (ID) of the moving object 10, (iii) an ID of a passenger of the moving object 10, and (iv) a characteristic of the moving object 10 (e.g., model/version information, width, length, and/or height of the moving object 10).

The object server 230 may perform, through the object agent, (i) provision and/or update of information of the moving object 10, (ii) registration, update, and/or deletion of the ID of passenger riding on the moving object 10, (iii) provision and/or update of the information of the region of the moving object 10, and (iv) provision of information needed for generation of a new mobile object agent by the mobile object server 220.

At least one passenger server 240 of a plurality of passenger servers may communicate with the gateway 160, and include a passenger agent that contains information of at least one passenger. A passenger agent may correspond to each passenger or candidate passenger of moving objects 10, and contain information thereof. In one embodiment, the object agent may contain an ID of a passenger and a characteristic of the passenger (e.g., information of age, gender, type, and the like of license of the passenger). The passenger server 240 may perform, through the passenger agent, provision and/or update of information of the passengers.

As described above, the system 100 of the present embodiment may manage the moving objects by utilizing the mobile object agents in each mobile object server 220, and manage the events by utilizing the event agent in each event server 210. According to the system 100 of the embodiment, the system 100 can separately manage information relating to the moving objects 10 and events on the geographic space with a plurality of kinds of servers. Furthermore, the plurality of mobile object servers 220 can smoothly transfer the management of the moving objects 10 traveling across the regions via the mobile object agents, thereby improving the efficiency of the whole system 100. In addition, according to the system 100 of the embodiment, each event server 210 divides event management in one region among the plurality of event agents and provides the mobile object agent with event information, thereby improving the efficiency of event management in the region (e.g., improving response time of event search) and thus event notification to the moving objects 10. In addition, the system 100 can provide the mobile object agent with information of moving object 10 by the object agent of the object server 230. The system 100 can also provide the mobile object agent with information of passengers of the moving objects 10 by the passenger agent of the passenger server 240.

In addition, according to the system 100, the selector 224 may enable the mobile object servers 220 to execute the mobile object agent to collect information of the event from the selected event agent and provide the moving object 10 with information that assists the moving object 10 with traveling in the geographic space. This enables the system 100 to provide the moving objects 10 with proper information for traveling.

Furthermore, since the selector 224 selects appropriate event agent(s) for processing source information and the event server 210 detects an event based on the source information by the selected event agent, the event servers 210 can distribute the processing of events to the plurality of event agents based on the types of events, and thereby the system 100 can efficiently handle these events.

In the embodiment of FIG. 3, each subsystem may include an event server 210 and a mobile object server 220. In another embodiment, each subsystem 200 includes an event server 210, mobile object server 220, an object server 230, and a passenger server 240. However, other embodiments are also possible, in which each subsystem 200 comprises any combination of singles or multiples of each server. In other embodiments, the system 100 may manage allocation of object agents of the object server 230 and passenger agents of the passenger server 240 in the subsystem 200. For example, the gateway apparatus 160 may change allocation of the object/passenger agents to the subsystems 200 to rectify the imbalance of data processing loads among the subsystems 200.

In the embodiment described above, the event server 210 may manage allocated event agents. In other embodiments, the system 100 may manage allocation of event agents to the event servers 210. For example, the gateway apparatus 160 may change allocation of event agents to the event servers 210 to rectify the imbalance of loads of processing events among the event servers 210. In the embodiment described above, the event server 210 causes each event agent to manage a portion of a region. In other embodiments, the event server 210 causes at least one event agent to manage specific information regarding events.

Figure 4:
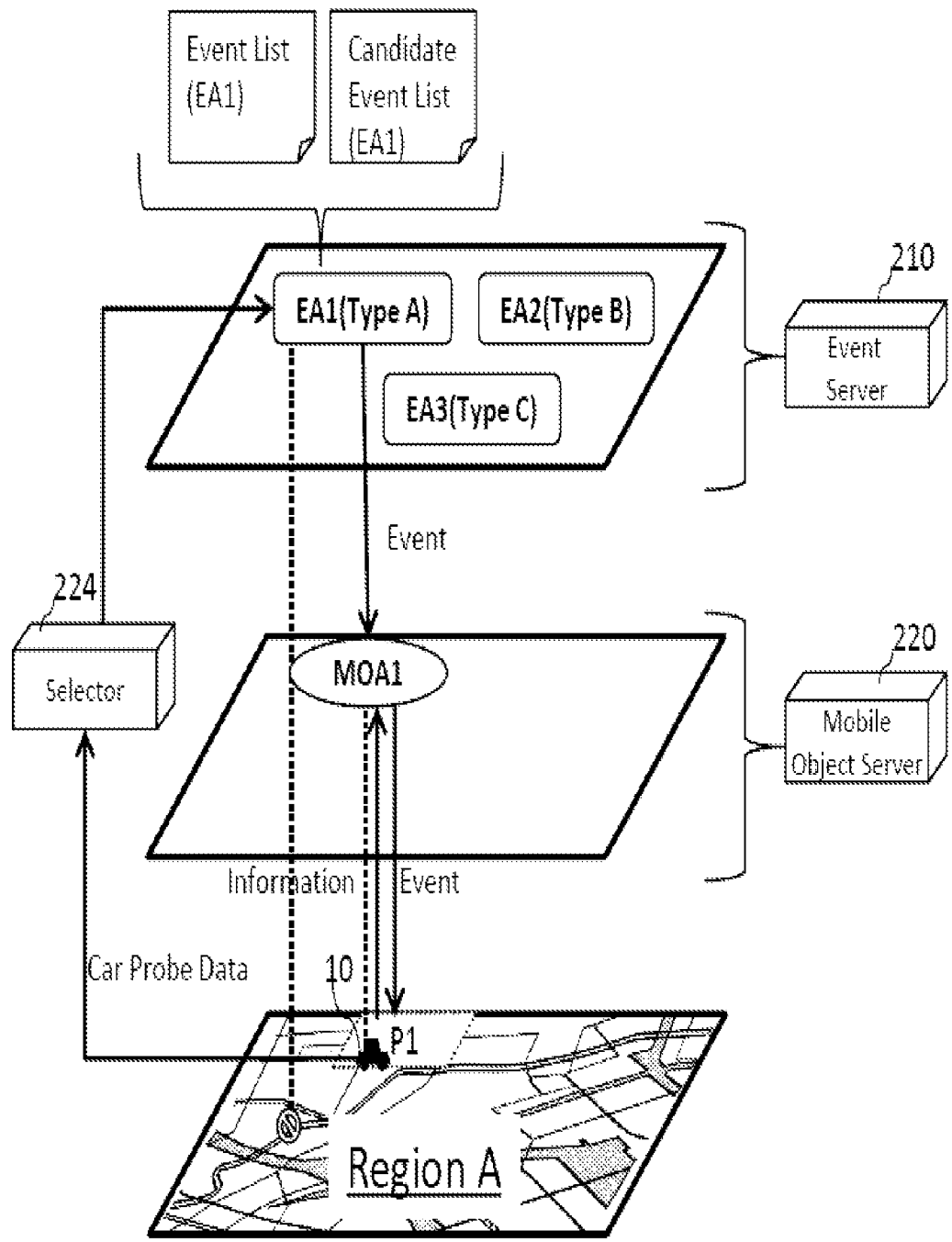
FIG. 4 shows management of events by the event server 210 and the mobile object server 220, according to an embodiment of the present invention.

FIG. 4 shows management of events by the event server 210 and the mobile object server 220, according to an embodiment of the present invention. In this embodiment, a moving object 10 is traveling on a target route on region A, and transmitting car probe data including the position information to the selector 224 via a gateway apparatus, such as the gateway apparatus 160. In this embodiment, the event server 210 executes event agents EA1, EA2, and EA3, wherein the event agent EA1 handles one type of events (type A), the event agent EA2 handles another type of events (type B), and the event agent EA3 handles the other type of events (type C). These event agents EA1, EA2, and EA3 may use different event detection rules for detecting each type of event (Type A-C). The event server 210 manages event information through each event agent EA1-EA3 based on the source information including the car probe data from the moving objects 10 in region A.

Each event agent EA1-EA3 may manage an event list (containing information of an event and an influence event for routes on the portion managed by the event agent) and an event candidate list (containing information of candidates of an event for routes on the portion managed by the event agent). The event list/event candidate list may be stored in the memory of the event server.

In the embodiment of FIG. 4, the event agent EA1 manages events of a portion (indicated as "P1" in the region A of FIG. 4) by the event list of the event agent EA1 and the event candidate list of the event agent EA1 based on car probe data from the moving object 10 in the portion P1. In one example, the portion P1 may include routes (edges) in an urban portion of the region A or one of the divided areas of the region A. The event agent EA1 assigned to the portion P1 is executable to generate an event based on the information from the moving object 10. With the plurality of types of event agents EA1-3, the event server can handle a plurality of types of events, which may occur in a different kind of area, location, time, weather, and environment, and can handle the same or similar kinds of events with different event detection rules depending on area, location, time, weather, and environment.

For example, the selector 224 may select the event agent EA1 based on the type of the car probe data and send the car probe data to the selected event agent EA1. The event agent EA1 may generate the event candidate from the car probe data and update the event candidate list and the event list based on the event candidate provided from the selector 224.

In one embodiment, each mobile object server 220 is operable to receive information from the moving object 10 in the region A assigned to the mobile object server 220. The mobile object server 220 determines the target route where the moving object 10 is located. The mobile object server 220 may send the information to one event server 210 assigned to a region A where the moving object 10 is located, and thereby requests the event agent EA1 assigned to the portion P1 where the target route is located to send an event list containing information of an event on the target route and the influence event of the target route.

The mobile object server 220 executes the mobile object agent MOA1 for the moving object 10 to provide the moving object 10 with information that assists the moving object 10 with traveling in the portion P1 based on the information of the event on the other route and the influence event of the target route. In the embodiment of FIG. 4, the mobile object agent MOA1 receives, directly or indirectly from the event agent EA1, the event information of the route on which the moving object 10 exists, and provides the moving object 10 with the event information (e.g., information of closure).

Figure 5:
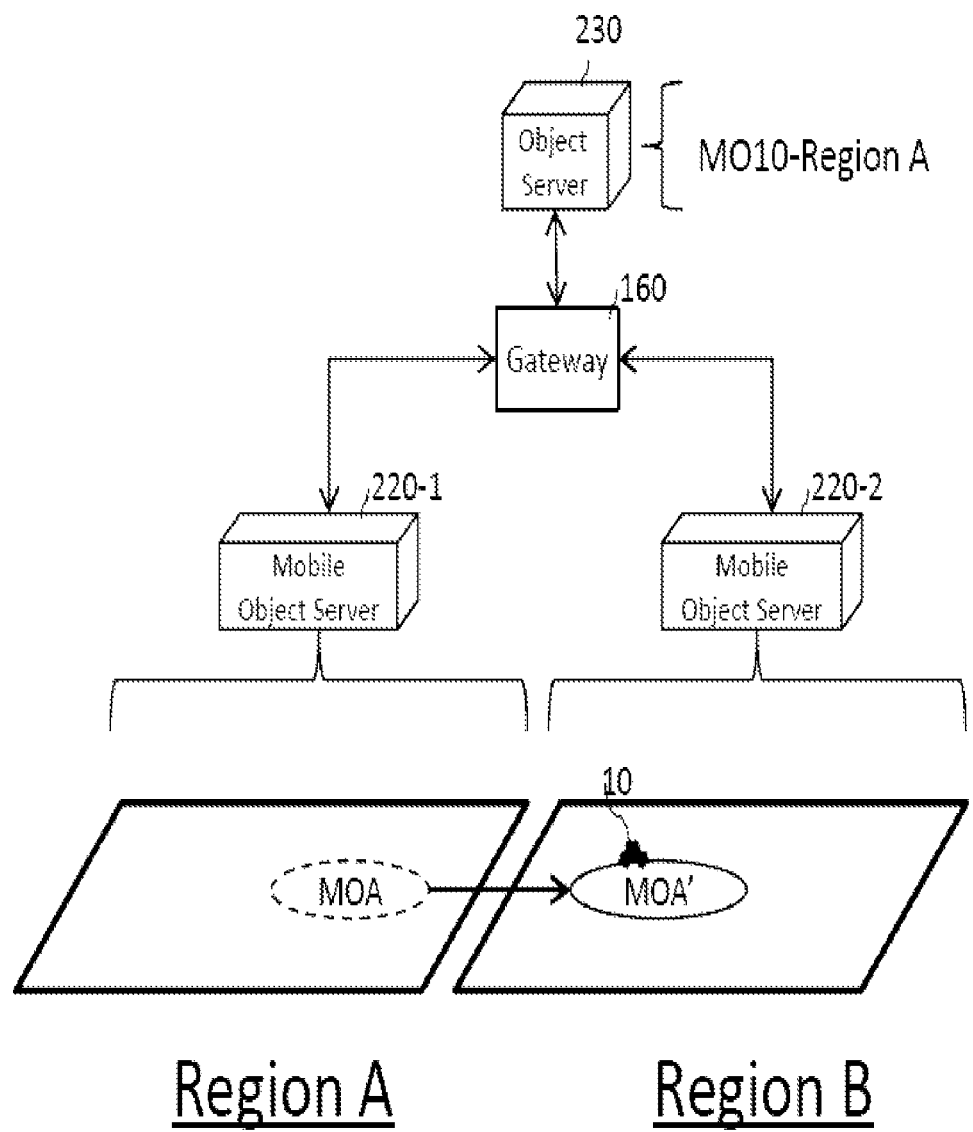
FIG. 5 shows management of moving object by the mobile object server 220 and object server 230, according to an embodiment of the present invention.

FIG. 5 shows management of a moving object 10 by the mobile object servers 220 and object server 230, according to an embodiment of the present invention. The mobile object server 220-1 may transfer the mobile object agent to the mobile object server 220-2 assigned to a neighboring region in response to the moving object 10 moving to the neighboring region. In this embodiment, in response to a moving object 10 traveling from region A to region B, the mobile object server 220-1 managing region A deletes the mobile object agent MOA for the moving object 10, and a mobile object server 220-2 managing region B generates a mobile object agent MOA for the moving object 10.

In this embodiment, the object agent 230 may store information that includes a mobile object server identifier MOS-ID that identifies one of the plurality of mobile object servers 220 executing the mobile object agent corresponding to the object agent 10. Just after the moving object 10 arrives at region B, the mobile object server 220-2 has not been executing the mobile object agent for the moving object 10. The mobile object server 220-2 is operable to receive information from the moving object 10 in the region B assigned to the mobile object server 220-2.

Using the information from the moving object 10, the mobile object server 220-2 obtains the mobile object server identifier MOS-ID from the object server 230 that manages the object agent for the moving object 10 because the mobile object server 220-2 is not executing the mobile object agent for the moving object 10. The mobile object server 220-2 requests a mobile object server 220-1 identified by the mobile object server identifier MOS-ID to transfer the mobile object agent for the moving object 10. Then the mobile object server 220-1 managing region A transfers the mobile object agent to the mobile object server 220-2 assigned to a neighboring region B in response to the request.

Figure 6:
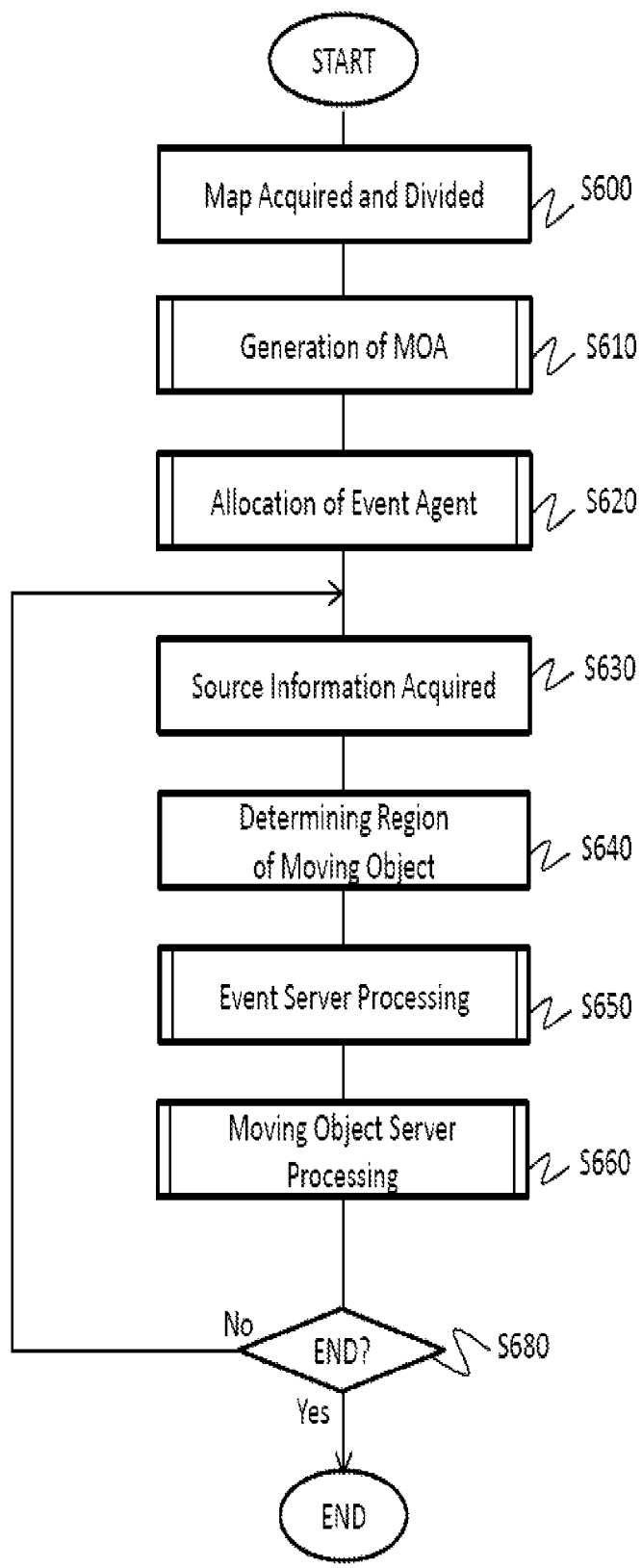
FIG. 6 shows an operational flow of an exemplary configuration of a system, according to an embodiment of the present invention.

FIG. 6 shows an operational flow of a system, according to an embodiment of the present invention. The present embodiment describes an example in which the system 100 performs the operations from S600 to S680 shown in FIG. 6 to manage moving objects, such as moving object 10, and events on the geographic space. FIG. 6 shows one example of the operational flow of the system 100 shown in FIGS. 1-5, but the system 100 shown in FIGS. 1-5 is not limited to using this operational flow. Also, the operational flow in FIG. 6 may be performed by other systems.

First, an acquiring section, such as the acquiring section 110, may acquire the map data of the geographic space to be managed by the system (S600). The acquiring section may acquire map data of a geographic space that includes one or more cities, one or more towns, and the like. The acquiring section may include map data of a geographic space including one or more states, countries, continents, etc. A dividing section, such as the dividing section 130, may divide the map area to generate a plurality of regions.

The acquiring section 110 may further acquire event detection rules from an external database or other entity internal or external to the system 100, and provide the storage section 142 with the event detection rules. The event detection rule may be a condition on which an event candidate is generated from source information, and may be described by XML. The event detection rule may also include a condition on which the event candidate is changed to an event.

Next, the system may generate a mobile object agent for the moving object (S610). The system may perform the process of S610 if a user (passenger) initializes a setting of a moving object and any passengers of the moving object, before starting to drive the moving object.

Next, the system may perform an allocation of event agents for event detection rules and portions of a region for the plurality of regions (S620).

After S620, a gateway apparatus, such as the gateway apparatus 160, of the system may acquire source information (S630). The source information is information used for generation of an event candidate and may include information from the moving object, external database or other external entity. In one embodiment, the source information may be the car probe data from the moving object, or environment information (e.g., weather information) from the external entity. Although the system may acquire the car probe data from the plurality of the moving objects, the system acquiring a car probe data from one moving object (which, may be referred to as "a target moving object") is explained in the below description. The car probe data may include at least one of information from the moving object, a geographic characteristic of a location of the moving object, the environment of the location of the moving object, the current date, the current time, etc. In one embodiment, the car probe data may include information detected by the target moving object, such as current position information of the target moving object, a speed and/or direction of the target moving object, and event information observed by the target moving object (e.g., occurrence of ABS, detection of obstacles, environment around the moving object, or the like). In one embodiment, the position information may include an edge ID of an edge (which may correspond to a route on a map) on which the target moving object exists, and the distance between the current locations of the target moving object and the one end of the edge.

Next, the gateway apparatus may determine a region on which the target moving object is traveling based on the position information of the car probe data of the target moving object (S640). In one embodiment, the gateway apparatus may inquire a region manager, such as the region manager 140, about the region in which the target moving object is moving. An allocating section, such as the allocating section 146, of the region manager may determine the region of the target moving object, and provide the gateway apparatus with the information of the region of the target moving object. The gateway apparatus may provide an event server, such as the event server 210, that manages the determined region and a mobile object server, such as the mobile object server 220, that manages the determined region with the car probe data.

Next, the event server handles events based on the source information (e.g., the car probe data of the target moving object) (S650). In one embodiment, the selector may provide the event server with the source information to process events for the moving objects. The event server may cause event agents to generate event candidates from the source information and detect the events based on the density of event candidates. The event server may manage event information based on the car probe data for notification of events to the target moving object. The event server may process events through the event agent selected by the selector 224.

After S650, the mobile object server that is provided with the car probe data of the target moving object may manage a mobile object agent for the target moving object (S660).

After S660, the system determines whether to end the process for the target moving object (S680). In one embodiment, the gateway apparatus may determine whether the car probe date indicates that the engine of the target moving object has stopped. If the system determines not to end the process, then the system proceeds with the process of S630 for the target moving object. If the system determines to end the process, then the system ends the process for the target moving object, and may continue the process for other moving objects.

As described above, the system manages moving objects by utilizing mobile object agents realized by the plurality of the mobile object servers. Since the system can transfer the mobile object agent between the mobile object servers, it can efficiently manage the moving objects traveling around the plurality of regions. Furthermore, the system collects the source information (e.g., the car probe data from the moving objects) and manages events generated from the source information by utilizing the event agents. Since each event server divides a number of events occurring on its managing regions into a plurality of areas by utilizing the event agents, it can efficiently handle event information.

Processes S600-S620 may be performed once before starting S630-S680. Processes S630-S680 may be performed for every moving object.

Figure 7:
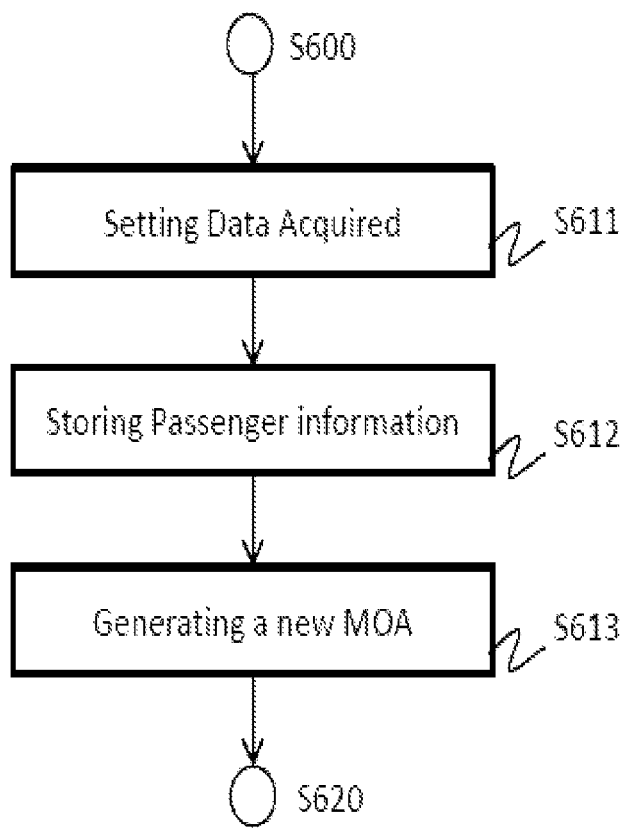
FIG. 7 shows an operational flow of S610, according to an embodiment of the present invention.

FIG. 7 shows an operational flow of generation of a moving object, according to an embodiment of the present invention. The present embodiment describes an example in which the system generates a new mobile object agent, such as the process of S610 of FIG. 6, through processes S611 to S613 shown in FIG. 7.

First, a gateway apparatus receives a setting data (including an ID of the moving object, an ID of each passenger, and position information of the moving object) from the moving object (S611). The gateway apparatus determines one mobile object server that manages the moving object based on the position information of the moving object. The gateway apparatus provides the determined mobile object server with the setting data. Then, the determined mobile object server obtains information (e.g., ID of each passenger) of each passenger, if any, of the moving object from the setting data of the moving object.

Then, the mobile object server may request the object agent of the object server for the moving object to store the information of each passenger of the moving object (S612). For example, each moving object may be mapped to each object agent of the object servers based on values of the IDs of the moving objects, and the mobile object server may identify one object agent corresponding to the ID of the moving object based on the calculation using the ID. Then, the mobile object server may provide the object server managing the identified object agent with the setting data including the position information, the ID of the moving object, and the IDs of any passengers of the moving object via the gateway apparatus.

Next, the object server stores the information of any passengers on an object agent. In one embodiment, each of the passengers may be preliminarily mapped to each of the passenger servers based on the values of the IDs of passengers, and the passenger servers may have information of passengers. The object server may identify one passenger server corresponding to the ID of a passenger based on the calculation using the ID. The object server may receive, via the gateway apparatus, information of passengers from the passenger server corresponding to the ID. Then, the object server may store or update the information of the moving object and the passengers of the moving object, in the object agent for the moving object. The object server may include the information of a region in which the moving object is currently moving, in the object agent.

Next, the mobile object server 220 managing the region in which the moving object 10 exists generates a new mobile object agent for the moving object 10 (S613). In one embodiment, the mobile object server 220 may copy the information of the object agent for the moving object 10 to the newly generated mobile object agent. For example, the mobile object server 220 may store the information of the moving object 10 and the information of the at least one passenger of the moving object 10 in the newly generated mobile object agent for the moving object 10.

Figure 8:
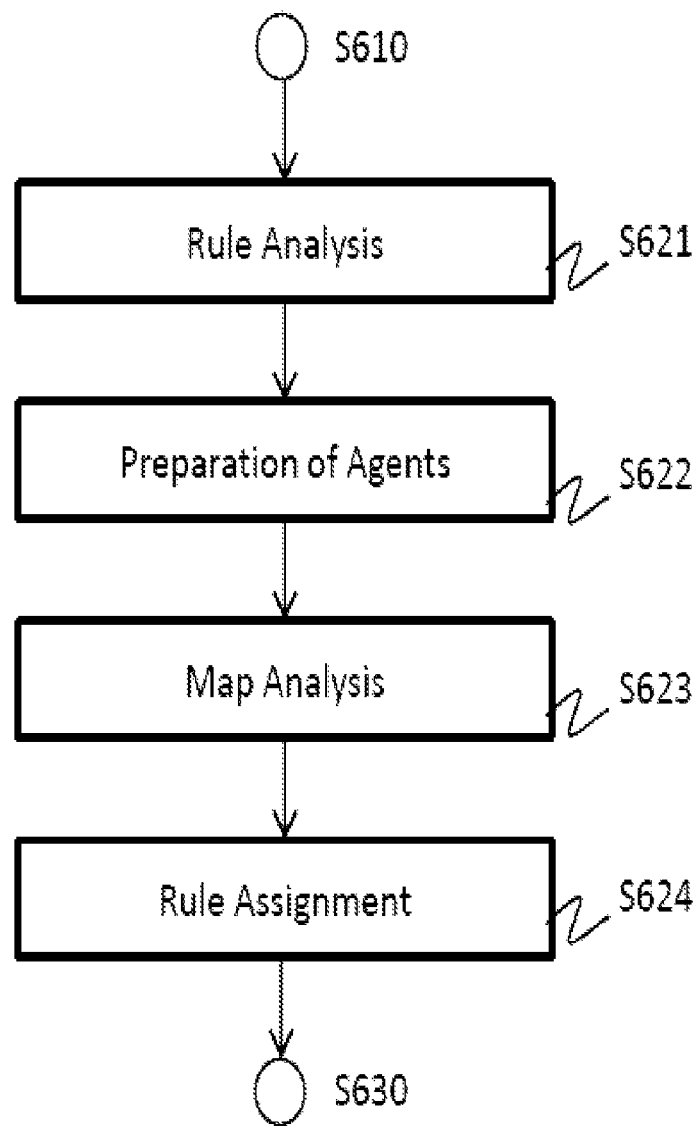
FIG. 8 shows an operational flow of S620, according to an embodiment of the present invention.

FIG. 8 shows an operational flow of S620, according to an embodiment of the present invention. The present embodiment describes an example in which the system performs allocation of event agents, such as the process of S620 of FIG. 6, through processes S621 to S624 shown in FIG. 8.

First, the rule analysis section analyzes the plurality of event detection rules that may be stored in the storage section (S621). The rule analysis section may determine a type of each of the event detection rules based on the event detection rule. In one embodiment, the rule analysis section may determine (a) a characteristic type of the event detection rules based on duration for which the rule is used for the detection of events/event candidates, frequency of events generated by the rule, and/or other characteristic(s) of events/event candidates for which the event detection rule is applied, and/or, (b) a location type of the event detection rules based on location, climate, and/or geography on which the event detection rule is applied.

In one embodiment, the rule analysis section may categorize each event detection rule as a "short time type" and a "long time type" as the characteristic type. In one embodiment, the rule analysis section may categorize each event detection rules as an "urban type" and a "suburban type" as the location type. The rule analysis section may give each event detection rule one or more of the characteristic and/or location types.

Next, the rule analysis section prepares a plurality of event agents for the event server(s) in each of the subsystem (S622). The rule analysis section may generate a plurality of event agents for each of groups of the characteristic types and/or the location types of the event detection rules analyzed at S621. In one embodiment, the rule analysis section may generate a group of event agents, each of which has large memory buffer size and a structure of which a buffer is easily reused, for the event detection rules for events/event candidates that frequently occur and exist in a short time, which may be categorized as "short time type" at S621. In one embodiment, the rule analysis section may generate a group of event agents, each of which allocates/de-allocates memory space for every event candidate, for the event detection rules for events/event candidates that occasionally occur and exist for a long time, which may be categorized as "long time type" at S621.

Next, the map analysis section, such as map analysis section 148 of FIG. 3, analyzes a map of the corresponding region of the geographic space (S623). In one embodiment, the map analysis section may assign a location type to each portion of the map (e.g., routes and/or divided areas in the map) based on the geographic characteristic of the portion. For example, the map analysis section may categorize each portion into "urban type" or "suburban type." The map analysis section may store correspondence between the portions and the location types into the storage section.

Next, the map analysis section assigns the event detection rules to the event agents (S624). In one embodiment, the map analysis section may assign one or more of the event detection rules analyzed at S621 to the event agents prepared at S622. For example, the map analysis section may assign the event detection rules of a specific characteristic type (e.g., "long time type") to the same type of event agent(s) (e.g., "long time type" event agent(s)), by selecting one or more of event agents from a group of the event agents categorized as the same type (e.g., "long time type"). The map analysis section may further assign the portions categorized at S623 to each of the event agents based on the location types thereof. In one embodiment, the map analysis section may assign a portion categorized as a certain type (e.g., "urban type") to the event agent(s) of the same type (e.g., "urban type"). The map analysis section may generate an agent mapping table including the assignment of the event agents to the event detection rules and/or the portions based on the result of analysis, and may store the agent mapping table in the storage section in the region manager.

As explained above, the rule analysis section and the map analysis section analyze event detection rules and portions of each region, and assign the event detection rules and the portions of each region to each event agent based on the result of analysis. Thereby, the event server may enable the event agents to efficiently handle the event detection rules.

Figure 9:
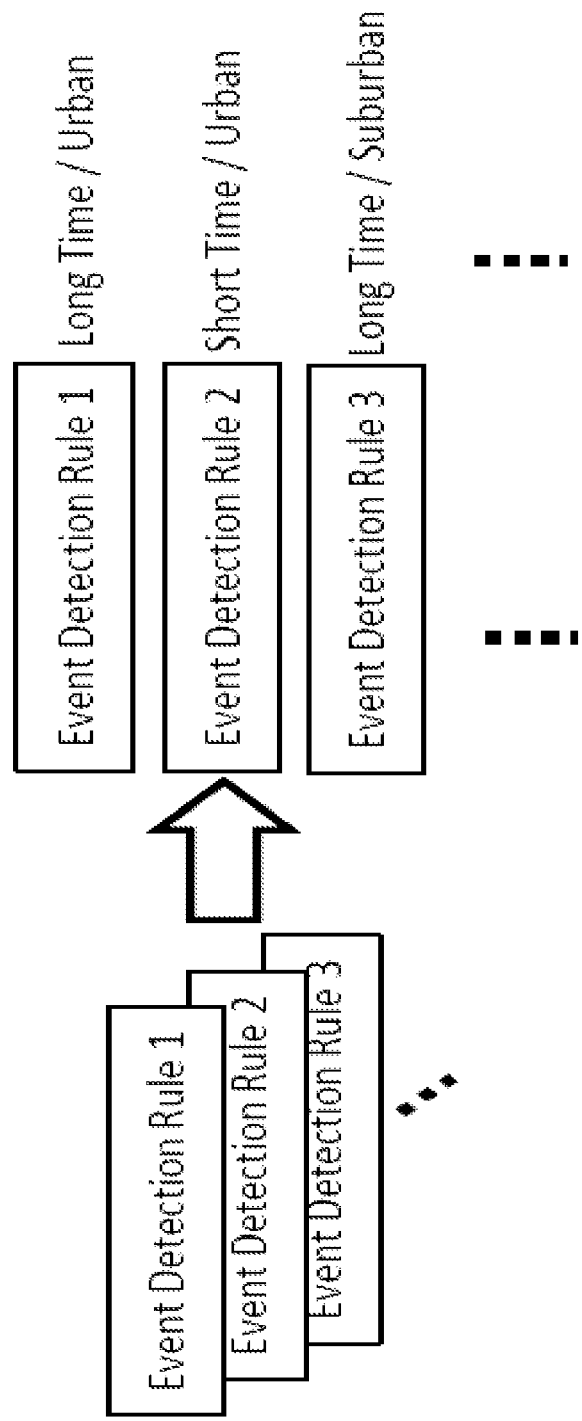
FIG. 9 shows a rule analysis, according to an embodiment of the present invention.

FIG. 9 shows a rule analysis, according to an embodiment of the present invention. As shown in the figure, the rule analysis section may receive event detection rules 1, 2, 3 . . . , and categorize each rules into "long time type" and "urban type", "short time" and "urban type", and "long time type" and "suburban type."

Figure 10:
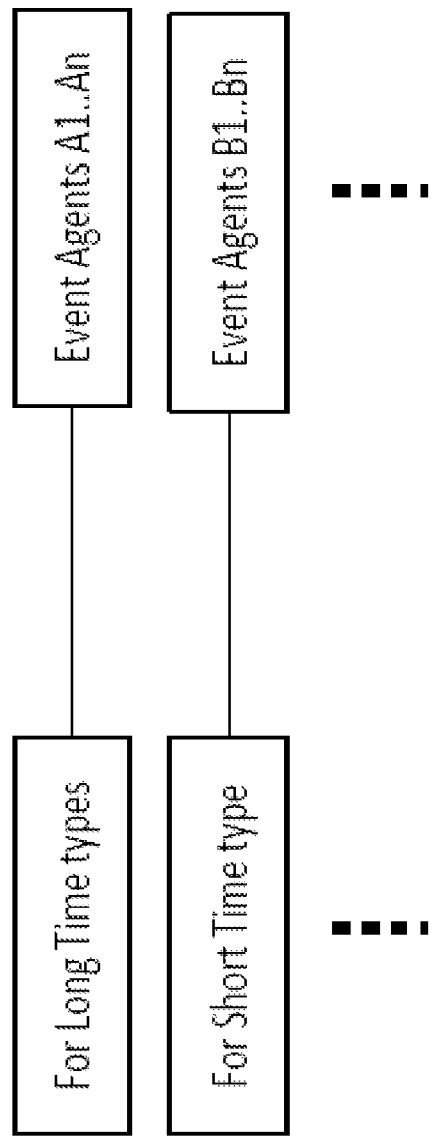
FIG. 10 shows a preparation of event agents, according to an embodiment of the present invention.

FIG. 10 shows a preparation of event agents, according to an embodiment of the present invention. As shown in the figure, the rule analysis section may prepare a group of an event agent A1, an event agent A2, . . . , and an event agent An for handing the event detection rules categorized as "long time", and a group of an event agent B1, an event agent B2, . . . , and an event agent Bn for handing the event detection rules categorized as "short time."

Figure 11:
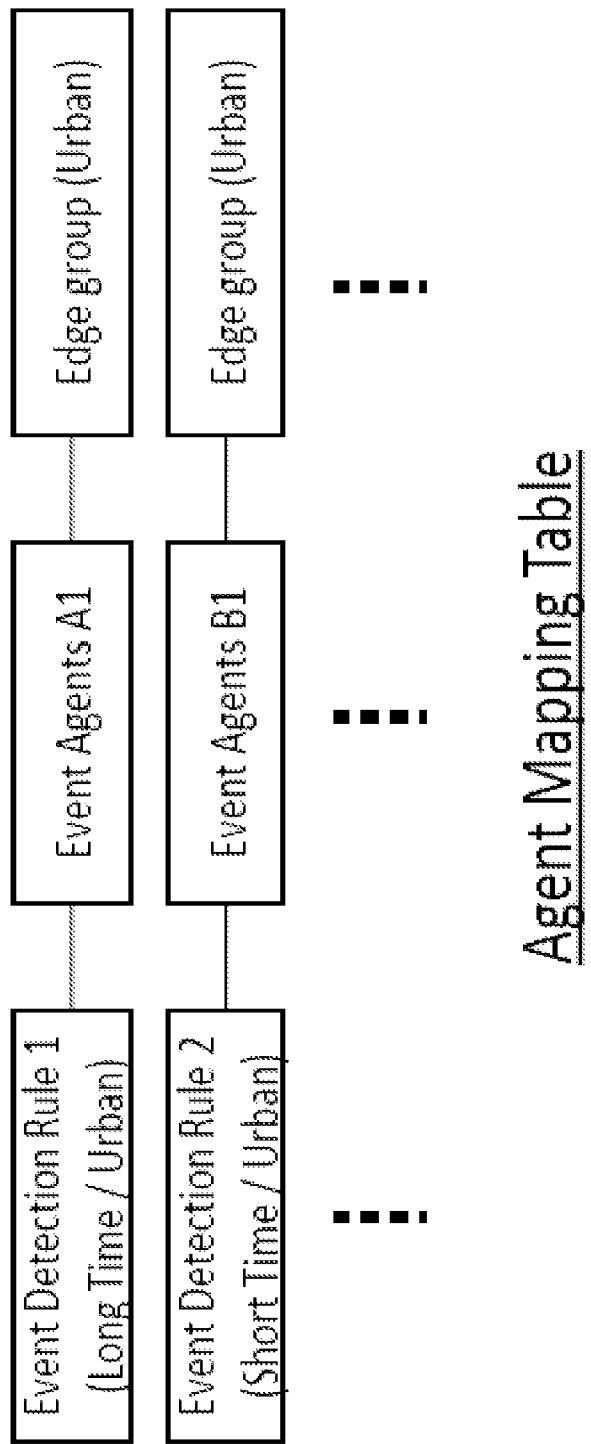
FIG. 11 shows an agent mapping table generated, according to an embodiment of the present invention.

FIG. 11 shows an agent mapping table, according to an embodiment of the present invention. As shown in the figure, the map analysis section may assign an event detection rules 1 ("long time" and "urban") to an event agent A1 ("long type"), and an event detection rules 2 ("short time" and "urban") to an event agent B1 ("short type"). The map analysis section may further assign an edge group including a plurality of edges on the region and corresponds to the portion of the map categorized as "urban", to the event agent A1 and the event agent B1. The map analysis section may generate an agent mapping table including a correspondence between the event detection rules, the event agents, and the portions as shown in the figure.

Figure 12:
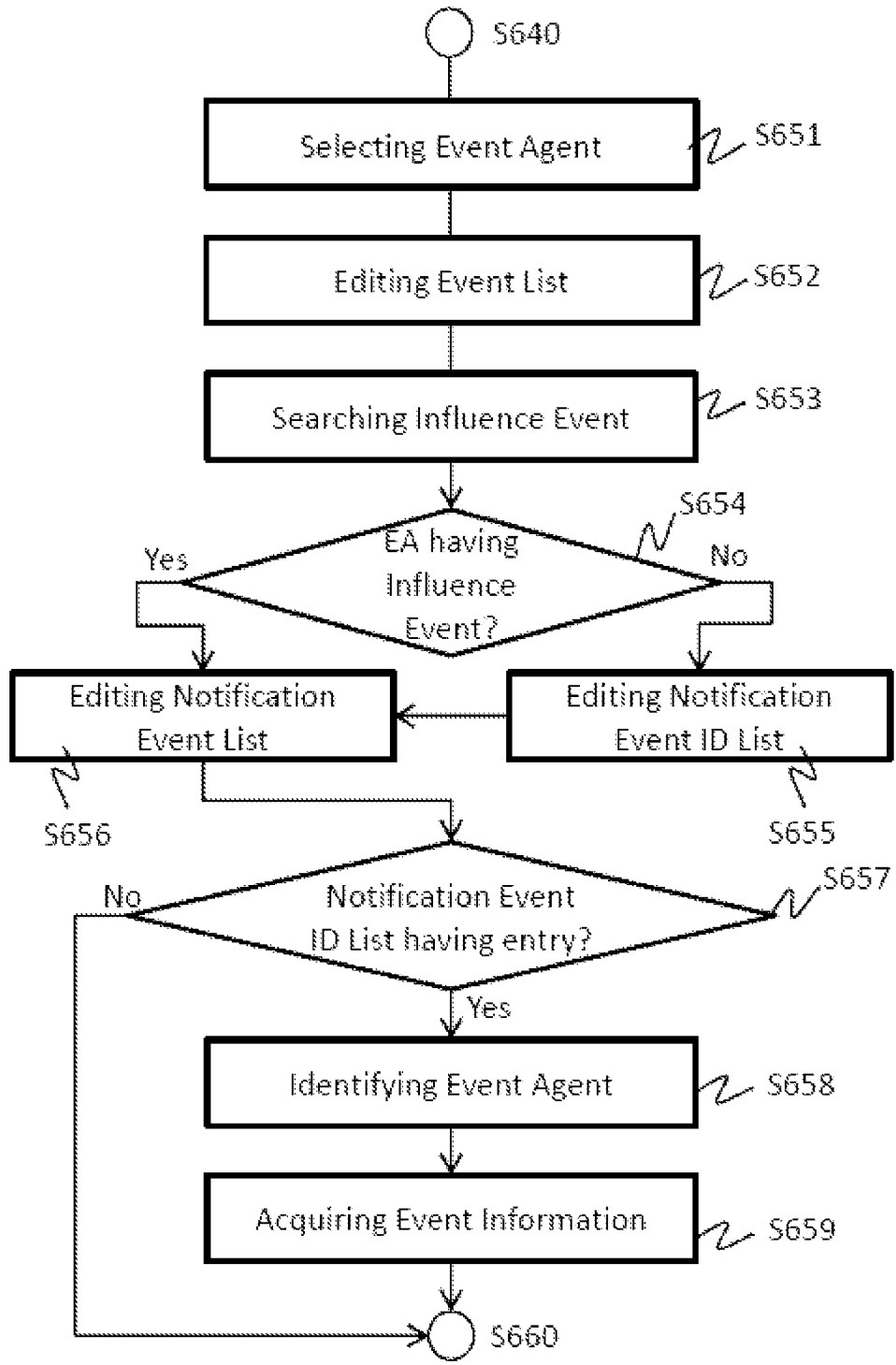
FIG. 12 shows an operational flow of S650, according to an embodiment of the present invention.

FIG. 12 shows an operational flow of event processing, according to an embodiment of the present invention. The present embodiment describes an example in which the system performs event processing, such as the event processing of S650 of FIG. 6, through processes S651 to S659 shown in FIG. 12.

First, the selector may select one or more event agents among the plurality of event agents of the event server based on the source information (S651). The selected event agent(s) may be referred to as "target event agent." In one embodiment, first, a determining section, such as the determining section 225 of FIG. 3, may receive the car probe data as the source information. The determining section may determine the type of the source information. In one embodiment, the determining section determines the location type of the source information based on a location of the moving object indicated in the source information. For example, if the determining section determines that the car probe data is from a portion categorized as an "urban type" in the region, then the determining section may determine the source information to be an "urban type." If the determining section determines that the car probe data is from a portion categorized as a "suburban type" in the region, then the determining section may determine the source information to be a "suburban type."

The determining section may further determine the characteristic type of the source information based on a characteristic of the source information. For example, if the determining section determines that the car probe data includes the use of ABS, then the determining section may determine the source information as a "short time" type, since events that cause use of ABSs of moving objects, such as a car accident or a slippery road, may not exist for a long time.

Then the determining section may determine which event detection rule(s) from the plurality of event detection rules is applied to the source information, based on the location and/or characteristic type of the source information. In one embodiment, the determining section may specify event detection rules assigned to the same location type and/or the same characteristic type as that of the source information (e.g., the event detection rules categorized as "urban type" and "short time"), by referring to the agent mapping table in the storage section. The determining section may further determine one or more event detection rules from the specified rules that can be applied to the source information. In one embodiment, the determining section may determine the event detection rule from the specified event detection rules further based on the source information regarding the environment (climate, weather, temperature, humidity, brightness, noisiness, and/or other elements regarding an environment) of a location of the moving object. In one embodiment, if the determining section determines that it is raining at the location of the moving object that provides the car probe data, then the determining section may select one or more of the event detection rules that are suited for rain.

Next, the dispatch section may determine one or more target event agents. In one embodiment, the dispatch section may identify the target event agent(s) that handles the event detection rule(s) selected by the determining section by referring to the agent mapping table in the storage section. The dispatch section may dispatch the source information of the target moving object, to the selected target event agent(s).

Next, the event server may generate an event candidate from the source information and edit an event list based on the event detection rules (S652). The event candidate is a candidate of an event in the geographic space. In one embodiment, the target event agent may generate an event candidate if the source information, such as the car probe data (which may include detection of Antilock Brake System (or ABS), braking, and/or a halt, as the information from the moving object), meets an event detection rule corresponding to the event candidate. In the embodiment, the target event agent may generate the event candidate if the car probe data explicitly or implicitly indicates an occurrence of an event. The event server may edit event candidate lists and event lists by the target event agent based on the event candidate. In one embodiment, the target event agent may generate or update information of events (e.g., an edge that an event occurs, an event ID, a location of an event, and content of an event) of the target route on the event list, and generate or update information of event candidates (e.g., an edge on which an event candidate occurs, a location of an event candidate, and content of an event candidate) of the target route on the event candidate list, based on information of the event candidate from the dispatch section.

In one embodiment, the event server may detect the event based on at least one of temporal density of event candidates and a spatial density of event candidates. In one embodiment, the event server may detect the event in response to the temporal density of the event candidates (e.g., a number of event candidates counted on certain duration on an event candidate list) exceeding a threshold, and/or, in response to the spatial density of event candidates (e.g., a number of event candidates occurring on certain section of a route (edge) on an event candidate list) exceeding a threshold. Hereinafter, the event of the target route may be referred to as a "target event." In one embodiment, conditions by which events are detected from event candidates may also be included in the event detection rules.

If the target event agent includes a plurality of event agents, then these event servers may use a partially or entirely common event list for managing events and event candidates of the same routes (edges).

Next, the event server may search, through the target event agent, for an influence event on the target route in the area of the target event agent based on the event candidate (S653). The influence event of the target route relates to an event on another route within a threshold distance (e.g., a threshold travelling distance of the target route, a threshold number of edges away from the target route, and/or a threshold travelling time from the target route). In one embodiment, the target event agent itself may search routes (or edge IDs) apart from the target route within the threshold distance based on the topology information of routes in the regions, or may request other entities (e.g., a server) to search for routes (or edge IDs). If the target event agent includes a plurality of event agents, then the event server may select one event agent from them to perform S653.

Next, the event server may determine whether the event list of the target event agent includes event entries corresponding to all influence events of the target route searched at S653 (S654). In one embodiment, the target event agent determines whether edges of the influence events are listed as edge IDs of events in the event list.

If a portion managed by a target event agent includes the routes (edges) of all influence events relating to an event, then an event list of the target event agent includes corresponding event entries of all influence events. However, if the routes (edges) of any influence events are managed by other event agents, then the event list may not include corresponding event entries of all influence events. If the decision is positive, then the event server proceeds with the process S656 and if negative, then the event server proceeds with the process S655.

At S655, the event server may edit a notification event ID list by the target event agent. The notification event ID list includes IDs of influence events and edge IDs of the influence events that are determined to be not included in the event list of the target event agent at S654. In other words, the notification event ID list is a list of event IDs of influence events that are not managed by the target event agent. Then, the event server may proceed with the process of S656. If the target event agent includes a plurality of event agents, then the event server may select one event agent from them to perform S655.

At S656, the event server may edit a notification event list for the target moving object, by the target event agent. The notification event list is a list of events that may be helpful to the target moving object traveling on the target route. The notification event list may include target events and influence events of the target events. The target event agent may add entries of the target events and the influence events in its managing event list for notification. If the target event agent includes a plurality of event agents, then the event server may select one event agent from them. The selected event agent may receive the information of the target events managed by the target event agent(s) that were not selected, from those target event agent(s).

Next, the event server determines, by the target event agent, whether the notification event ID list has at least one entry (S657). If the decision is positive, then the event server proceeds with the process of S658, and if negative, then the event server ends the process of S650.

At S658, the event server may identify, by the target event agent, an event agent that manages an event list including events in the notification event ID list. The determined event agent may be referred to as "remote event agent." If the target event agent includes a plurality of event agents, then the event server may select one event agent from them to perform S658.

Next, the event server may acquire information of events in the notification event ID list (S659), and end the process S650. In one embodiment, the target event agent may receive information of events in the notification event ID list from the remote event agent, and edit the notification event list based on the acquired information. In another embodiment, the target event agent may add entries of the influence events in the notification event ID list based on the acquired information. If the target event agent includes a plurality of event agents, then the event server may select one event agent from them to perform S659.

FIG. 13 shows an illustrative example of an event list, according to an embodiment of the present invention. As described in FIG. 13, the event list may include edge IDs of events, event IDs of events, locations of events, specific contents of events, and influence events relating to events. In this embodiment, each route is represented as "edge." For example, this event list indicates that an event (identified as "Eve 0214") has occurred along the full length of edge 0001 on the area, that the event has limited the speed to 30 km/h, and that edge 0001 includes an influence event identified as "Eve 0114." The event list also indicates that an event (identified as "Eve 0114" on edge 0002) has occurred 32 m from the 1st node on edge 0002 on the area, that the event is a closure of a route, and that edge 0001 includes influence events identified as "Eve 0214" on edge 0001, "Eve 0421" on edge 0003, etc. In one embodiment, the target event agent may add a new entry corresponding to an event detected by the car probe data, in the event list.

According to the first entry in the event list of FIG. 13, the edge 0001 has influence event 0114. This may mean that a moving object traveling on the edge 0001 is influenced by the event 0114 that has occurred apart from edge 0001 within a threshold distance. In response to receiving the car probe data including the position information indicating that the target moving object is traveling on the edge 0001, the target event agent searches and obtains routes (edge IDs) apart from the target route (edge 0001) within the threshold distance, and then finds neighboring edge 0002 as a result. In response to receiving the car probe data including the position information of the edge 0001, the target event agent determines whether the edge of influence event (edge 0002) corresponding to the target route is listed as edge IDs in the event list.

The target event agent assigned to the area may generate or update an event candidate based on information from the target moving object. In one embodiment, the target event agent may generate or update event candidates on the event candidate list including information of a plurality of edges on the area of the event agent based on information of the car probe data.

Although the event list of FIG. 13 includes information of influence events, the information of the influence events may be managed by another list. In one embodiment, the event agent may manage both a first event list containing information of an event on the target route and a second event list containing information of the influence event.

FIG. 14 shows an illustrative example of an event candidate list, according to an embodiment of the present invention. As described in FIG. 14, the event list may include edge IDs of event candidates, event detection rules under which event candidates are counted, counts of detecting event candidates, locations of event candidates, and specific contents of event candidates for each event candidate. For example, this event candidate list indicates that evidence of an event (congestion) has been counted twice under Rule 1 along the full length of edge 0009 on the area, and that evidence of an event (skid) has been observed once at a point 15 m from the 2nd node on edge 0013 on the area.

The target event agent may determine whether to change an event candidate in the event candidate list to an event in the event list, for example at S652 of FIG. 12. In one embodiment, the target event agent may upgrade the event candidate to the event based on information from other moving objects. In this case, the target event agent counts occurrences of an event candidate observed by a plurality of moving objects (including the target moving object and other moving objects). If the count of an event candidate exceeds a threshold value, then the target event agent determines that the event candidate is upgraded to an event. In one embodiment, in response to the upgrade, the target event agent deletes the entry of the event candidate from the event candidate list, and generates a new entry of an event corresponding to the deleted event candidate. The event servers may set the same or different criteria for upgrading event candidates among the plurality of event agents.

FIG. 15 shows an illustrative example of a notification event list, according to an embodiment of the present invention. As described in FIG. 15, the notification event list may include edge IDs of target/influence events, event IDs of target/influence events, locations of target/influence events, and specific contents of target/influence events. For example, this notification event list indicates that an event (speed limit) has occurred along the full length of edge 0001 on the area, and that an event (closure) has occurred at a point 32 m from the 1st node on edge 0002 on the area.

Figure 16:
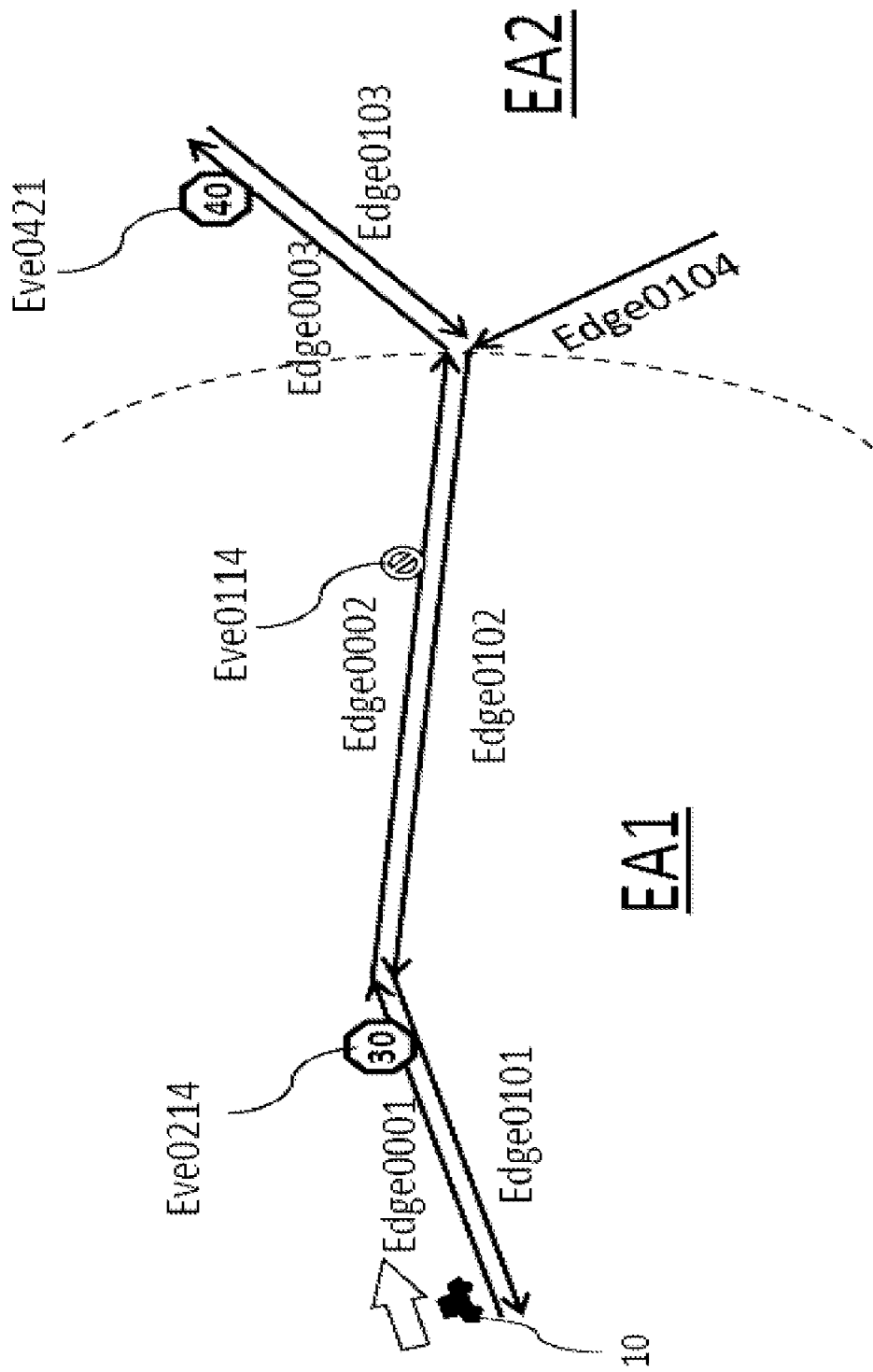
FIG. 16 shows a moving object and events, according to an embodiment of the present invention.

FIG. 16 shows a moving object and events, according to an embodiment of the present invention. In the embodiment of FIG. 16, the target moving object 10 is traveling eastbound on the edge 0001, which is the target route. In this embodiment, the target event agent EA1 is assigned the edge 0001, the edge 0002, the edge 0101, and the edge 0102, and the other event agent EA2 is assigned the edge 0003, the edge 0103, and the edge 0104. In the embodiment, the event agent EA1 may be urban type, and the event agent EA2 may be suburban type.

Direction dependent edges are described in FIG. 16. However, edges may not be direction dependent according other embodiments, and in such embodiments, the event agent may manage events, event candidates, and influence events with direction information. The target event agent EA1 manages an event (Eve 0214) on the edge 0001 as the target event in the event list. Since the edge 0002 is apart from the edge 0001 within the threshold distance, the target event agent EA1 also manages an event (Eve 0114) on the edge 0002 as an influence event in the event list. The target event agent EA1 manages a notification event list including the target event (Eve 0214) and the influence event (Eve 0114) for the target moving object 10.

In the embodiment of FIG. 16, the mobile object agent managing target moving object requests the event agent EA1 that manages the target event (e.g., Eve 0214) and the influence event (e.g., Eve 0114) to send the notification event list including the target event and the influence event. In another embodiment, the mobile object agent may request the remote event agent EA2 that manages the information of influence event(s) (e.g., Eve 0421) to send a notification event list containing information of the influence event(s) if the influence event is located outside of the area including the target route (Edge 0001).

Figure 17:
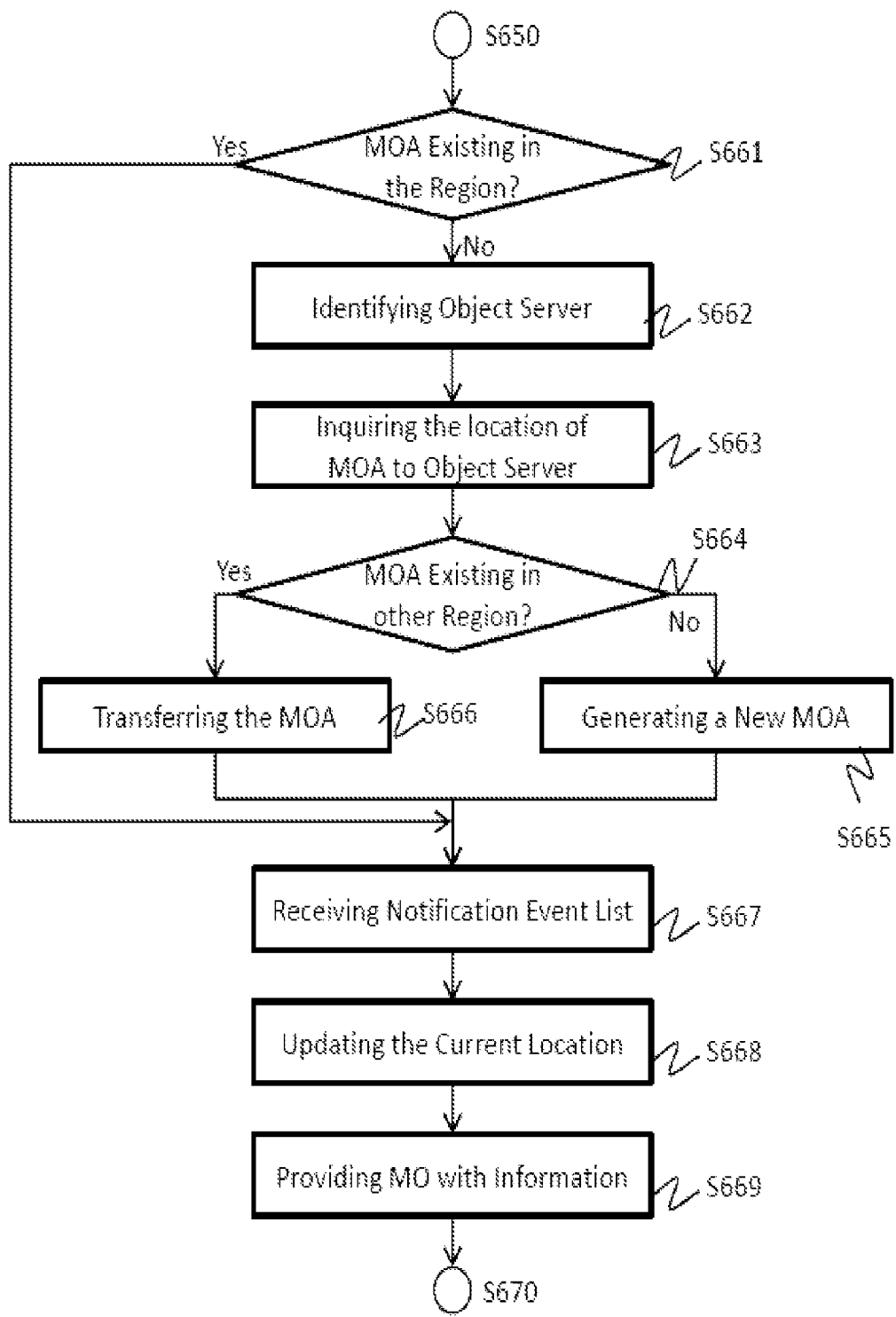
FIG. 17 shows an operational flow of S660 according to the present embodiment.

FIG. 17 shows an operational flow of moving object processing, according to an embodiment of the present invention. The present embodiment describes an example in which the system manages the target mobile object, such as in S660 of FIG. 6, through processes S661 to S669 shown in FIG. 17.

At S661, the mobile object server may determine whether the mobile object agent for the target moving object exists in the region determined to be the region of the moving object, such as the region determined at S640. In other words, the mobile object server determines whether the mobile object server manages the mobile object agent of the target moving object. If the decision is positive, then the mobile object server proceeds with the process S667, and if negative, the mobile object server proceeds with the process S662.

At S662, the mobile object server may identify an object server that includes the object agent containing the information of the target moving object. In one embodiment, the mobile object server may identify the object server in the same manner described in S612.

Next, at S663, the mobile object server may inquire the object server 230 identified at S662 for the location of the mobile object agent of the target moving object. The object server may refer to the object agent of the target moving object, obtain information of the mobile object server that currently manages the mobile object agent MOA of the target moving object, if it exists, and provide the mobile object server with the information.

Next, the mobile object server may determine whether the mobile object agent for the target moving object exists in any other regions. In other words, the mobile object server may determine which mobile object server manages the mobile object agent for the target moving object from the plurality of mobile object servers managing other regions, at S663. If the decision is positive, then the mobile object server proceeds with the process S666, and if negative the mobile object server proceeds with the process S665.

At S665, the mobile object server generates a new mobile object agent MOA for the target moving object. The mobile object server may generate the mobile object agent MOA for the target moving object by obtaining information of the target moving object from the object server that includes the object agent containing the information of the target moving object. In one embodiment, the mobile object server may generate the new mobile object agent in the same manner described in S613. The mobile object server may also communicate with the object server via the gateway apparatus, and register the current region of the target moving object in the object agent corresponding to the target moving object. By generating the new mobile object agent, the system can handle a new moving object 10 that has been not managed by the mobile object server.

At S666, the mobile object server may transfer the mobile object agent from the other mobile object server determined to manage the mobile object agent for the target moving object at S664. In one embodiment, the mobile object server may receive information of the mobile object agent for the target moving object from the other mobile object server, and generate a new mobile object agent including the received information. The mobile object server may also communicate with the object server via the gateway apparatus, and register the current region of the target moving object in the object agent of the target moving object.

Next, at S667, the mobile object server may receive a notification event list for the target moving object. In one embodiment, the mobile object server first determines the target route where the target moving object is located. Then, the mobile object server may request the event agent that manages the information of target event(s) and influence event(s) corresponding to the target route to send a notification event list containing information of the target event(s) and influence event(s) of the target route. In one embodiment, the mobile object server may send a request to the event agent(s) that is the target event agent determined at S651 in S650 by the selector. In the embodiment, the mobile object server is operable to execute the mobile object agent to collect information of an event from the event agent selected by the selector.

At S668, the mobile object server may update the current location of the target moving object by the mobile object agent. In one embodiment, the mobile object agent for the target moving object updates the current location of the target moving object based on the position information of the source information (e.g., car probe data).

At S669, the mobile object server may execute the mobile object agent for the target moving object to provide the target moving object with information that assists the target moving object with traveling in the geographic space based on the information included in the event list. In one embodiment, the mobile object agent may provide the target moving object with information of events on the notification event list.

In one embodiment, the at least one mobile object server may execute the mobile object agent for the target moving object to provide the target moving object with information that assists the target moving object with traveling in the geographic space based on the information of the at least one passenger of the target moving object. For example, the mobile object agent may provide the target moving object with an alert, a notice, and/or an action list relating events on the notification event list depending on a number of passengers (e.g., for guiding a car pool lane), the age, gender, license, real time information (e.g., driving history or sleep history), and characteristics of the passengers.

The action list is a list of actions recommended to passengers in response to the events (e.g., braking, accelerating, and/or steering of the target moving object).

The action list may include commands to the target moving object for automatic driving and/or driving assist. In one embodiment, the mobile object agent may include information that the passenger is sensitive to rough driving, and then the mobile object agent may provide commands to gently drive the target moving object. In one embodiment, the mobile object agent may include information of driving skill of a driver passenger, and then provide different commands depending on the skill of the driver. The mobile object server may provide the target moving object with the information via the gateway apparatus.

As described above, the mobile object server receives information from the target moving object in the region assigned to the mobile object server, and generates the mobile object agent for the target moving object if there is no mobile object server among the plurality of mobile object servers that is executing the mobile object agent.

Figure 18:
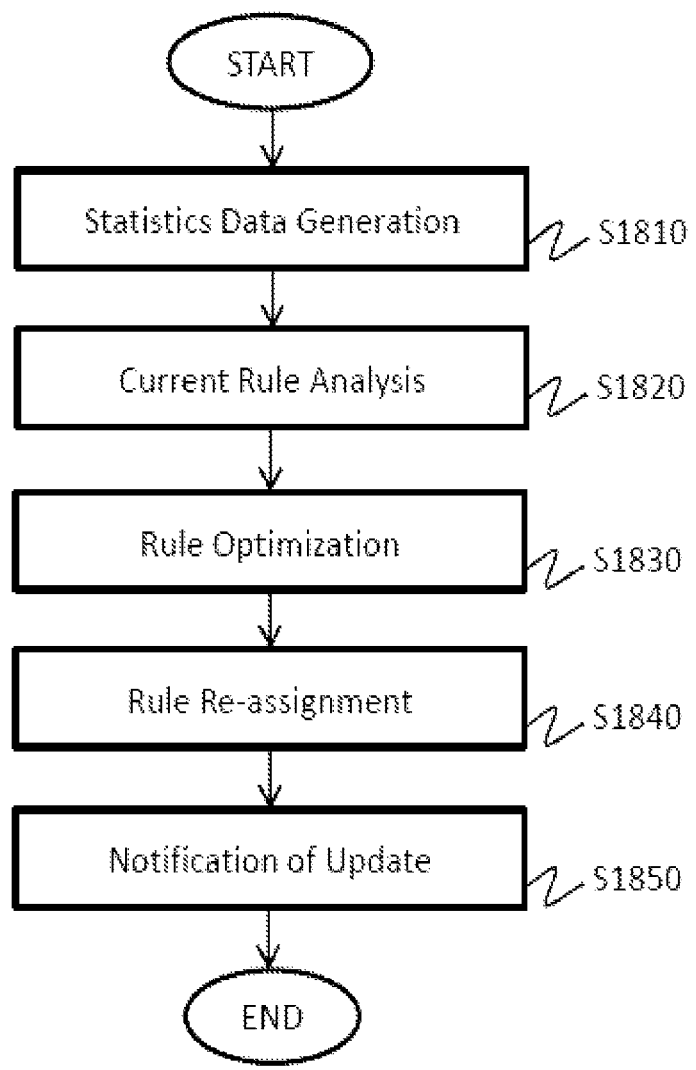
FIG. 18 shows another operational flow of an exemplary configuration of a system, according to an embodiment of the present invention.

FIG. 18 shows another operational flow of an exemplary configuration of a system, according to an embodiment of the present invention. The system 100 may perform the operations from S1810 to S1850 in FIG. 18 to create or update event detection rules and assignment of the event detection rules to the event agents. FIG. 18 shows one example of the operational flow of the system 100 shown in FIGS. 1-5, but the system 100 shown in FIGS. 1-5 is not limited to using this operational flow. Also, the operational flow in FIG. 6 may be performed by other systems. The system 100 may perform the flow of FIG. 18 during the flow of FIG. 6 (e.g., before S620 or during S630-S680) or independently of the flow of FIG. 6.

First, the rule analysis section generates statistics data (S1810). In one embodiment, the rule analysis section may collect information of detected events and at least one of information from moving objects and information of the environment of the geographic space. In the embodiment, the rule analysis section may collect information of car probe data from a plurality of moving objects (e.g., all or part of moving objects in the system) of the past, information of events and/or event candidates generated by the event server from the car probe data of the past, and information of actual event of the past (e.g., information of the past weather, record of past car accidents and etc.), which may be obtained from an external database, as the information of the environment. The rule analysis section may generate the statistics data of events based on the collected information. In one embodiment, the rule analysis section may calculate frequency of detection of event candidates (such as the detection of ABS), and/or traffic amount for each route (edge) for a certain duration (e.g., an hour) to generate the statistics data.

Next, the rule analysis section analyze whether currently used event detection rules are appropriate based on the statistics data (S1820). In one embodiment, the rule analysis section may evaluate the accuracy of each current event detection rule, with which the current event detection rule detects an event, based on actual occurrence of the event, the statistics data relating to the event, and the event detected by the current event detection rule. The rule analysis section may determine each current detection rule not to be valid if the evaluated accuracy does not exceed a threshold, and determine to be valid if the evaluated accuracy exceeds the threshold.

Next, the rule analysis section optimizes event detection rules based on the result of S1820 (S1830). The rule analysis section may delete the current event detection rules determined to be not valid. The rule analysis section may update the plurality of current event detection rules and/or add new current event detection rule(s) based on the collected information at S1810. In one embodiment, the rule analysis section may determine newly optimized event detection rules that are estimated to more accurately detect actual events, based on the collected information, for the update or the addition. In the embodiment, the rule analysis section may change a threshold used in the slip candidate detection rule to a strict value if the rule analysis section determines that the slip detected by the current detection rule did not actually occur.

Next, the map analysis section may assign the new event detection rules to the event agents (S1840). The map analysis section may assign the updated event detection rules to the same or different portion(s) of the region. The map analysis section may perform this process in the same manner with S624. The map analysis section may analyze a map of each region, and assign a plurality of types to the map in the same manner with S623, based on the information collected at S1810. In one embodiment, if the collected information indicates that ABS is used in a route (edge) of a portion of "urban type", which is not crowded by moving objects, then the map analysis section changes the route (edge) to a portion of "suburban type."

Next, the map analysis section may notify the update and/or addition of the new event detection rules to the selector and the event server (S1850). Then, the map analysis section may provide the selector and the event server with the new event detection rules. The map analysis section may further store the new event detection rules in the storage section.

In the embodiments above, the types of the event agents, the types of the event detection rules, and the types of the portions are explained by "urban type" and "suburban type." However, a wide variety of types, such as "short time type", which represents the events existing only in short time, "long time type", which represents the events existing in long time, may be used for the above and other embodiments. Therefore, the event agent that is categorized as "short time type"/"long time type" and handles events/event candidates existing in a short time/long time, may be prepared by the rule analysis section. With "long time type" and "short time type", the system can optimize an amount of data that it holds during the process.

Other types, such as "a congestion" event agent, which handles only or mainly the events and the event detection rules of congestion on routes (edges), "a specific weather (e.g., rain, thunderstorm, hurricane, snow, high/low temperature, and etc.) type" event agent, which handles only or mainly events and event detection rules associated with the specific whether, "ends of the congestion" event agent, which handles only or mainly event detection rules detecting ends of congestion and the ends of the congestion as events, "curvy routes" event agent, which handles only or mainly events and event detection rules associated with routes (edges) that are curvy, and "foot/bicycle passengers" event agent, which handles only or mainly events and event detection rules associated with routes (edges) on which foot/bicycle passengers exists more than a threshold amount may be used for the above and other embodiments. The congestion events and weather events tend to exist for longer times than other events. By this embodiment, the system can separately handle congestion events and weather events through dedicated event agents, which may improve the event processing of the congestion.

Still another type, such as "an external" event agent, which handles only or mainly the events and the event detection rules associated with events detected only by source information of the external information source (e.g., a server external to the system), may be used for the above and other embodiments. For example, weather information may be provided to the system by the external information source, and the "external" event agent may only handle such weather-related events and event detection rules. According to the embodiment, the system can separate the event agent(s) that need external information from other event agents.

In one embodiment, the event server may transfer the information of events to other event agent(s). In the embodiment, when it becomes rain from a fair weather, the event agent having a type associated with rain may take over the event information (e.g., the event list, the event candidate list, and etc.) from the other event agent(s) (e.g., an event agent having a type associated with other weather(s)).

Figure 19:
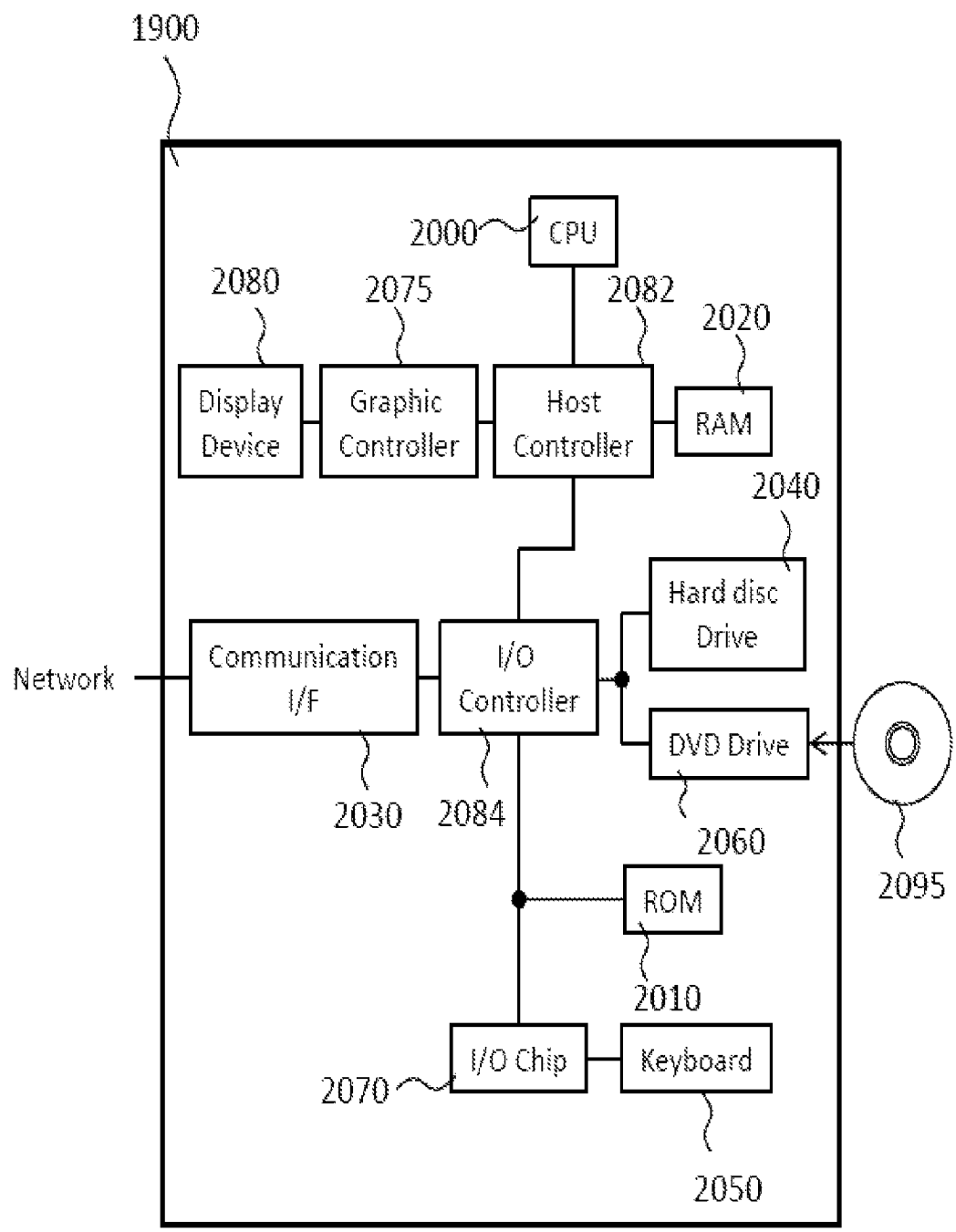
FIG. 19 shows a computer according to an embodiment of the present invention.

FIG. 19 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050, which are connected to the input/output controller 2084 through an input/output chip 2070.

The host controller 2082 connects the RAM 2020 with the CPU 2000 and the graphics controller 2075, which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900.

The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the region manager, the subsystems and other element(s) in the system 100 of FIG. 3. The program or module acts on the CPU 2000, to cause the computer 1900 to function as a section, component, element such as the allocating section 146, the rule analysis section 147, map analysis section 148, determining section 225, and dispatch section 226.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing.

Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize a system for managing events and moving objects on the geographic space.

What is claimed is:

1. A computer program product for managing mobile objects, the computer program product comprising one or more computer-readable storage devices and program instructions stored on at least one of the one or more computer-readable storage devices, the program instructions comprising:

receiving source information from a first mobile object of a plurality of mobile objects pertaining to an event candidate occurring in a geographic space, wherein the source information is based on probe data from the first mobile object;

determining an event type of the event candidate;

determining an event location type of the event candidate;

determining a detected event based on matching the event type, the event location type and the source information pertaining to the event candidate to an event rule;

determining an event agent of an event server to manage movement based on the event rule, wherein a buffer size and structure of the event agent is generated based on whether the event rule is a short time type or a long-time type;

determining a characteristic of a passenger in a second mobile object; and assisting movement of the second mobile object based on the detected event and the characteristic of the passenger, wherein assisting movement comprises commanding an action of the second mobile object, and wherein the commanded action is selected from the group consisting of: an automatic driving command and a driving assist command.

2. The computer program product of claim 1, wherein determining the event type comprises matching information received from the first mobile object to the event detection rules for the geographic space.

3. The computer program product of claim 1 further comprising determining the event detection rule from a plurality of event detection rules based on a type of source information.

4. The computer program product of claim 3 further comprising determining an accuracy of the event detection rule, wherein the accuracy is based on an actual occurrence of the detected event, traffic statistics relating to the detected event.

5. The computer program product of claim 4 further comprising removing the event detection rule when the accuracy is below a threshold.

6. The computer program product of claim 4 further comprising updating a threshold for the event detection rule based on an actual occurrence of the detected event.

7. The computer program product of claim 1, wherein managing movement of the second mobile object is based on a passenger in the second mobile object.

8. The computer program product of claim 1, wherein determining the detected event is further based on a temporal density of event candidates from the plurality of mobile vehicles.

9. The computer program product of claim 1, wherein determining the detected event is further based on a spatial density of event candidates from the plurality of mobile vehicles.

10. The computer program product of claim 1, wherein determining the detected event is based on determining a detected event in an adjacent geographic area.

11. A computer program product for managing mobile objects, the computer program product comprising one or more computer-readable storage devices and program instructions stored on at least one of the one or more computer-readable storage devices, the program instructions comprising:

receiving, by a first mobile object server, source information from a first mobile object of a plurality of mobile objects pertaining to an event candidate occurring in a geographic space, wherein the source information is based on probe data from the first mobile object;

receiving the source information pertaining to the event candidate;

determining an event type of the event candidate;

determining an event location type of the event candidate;

determining a detected event based on matching the event type, the event location type and the source information pertaining to the event candidate to an event rule;

selecting an event server to manage the detected event, wherein the event server is selected based on the determined event rule;

determining an event agent of the event server to manage the movement based on the event rule, wherein a buffer size and structure of the event agent is generated based on whether the event rule is a short time type or a long-time type; and assisting movement, by a second mobile object server, of the second mobile object based on the detected event which was received as source information by the first mobile object server.

12. The computer program product of claim 11, wherein determining the event type comprises matching information received from the first mobile object to the event detection rules for the geographic space.

13. The computer program product of claim 11 further comprising determining the event detection rule from a plurality of event detection rules based on a type of source information.

14. The computer program product of claim 13 further comprising determining an accuracy of the event detection rule, wherein the accuracy is based on an actual occurrence of the detected event, traffic statistics relating to the detected event.

15. The computer program product of claim 14 further comprising removing the event detection rule when the accuracy is below a threshold.

16. The computer program product of claim 11, wherein the first mobile object server manages a first region of a plurality of regions, wherein the second mobile object server manages a second region of a plurality of regions, wherein the plurality of regions divide geographic space.

17. The computer program product of claim 16, wherein the first region and the second region share a common boundary.

* * * * *